United States Patent [19]
Bonerb

[11] Patent Number: 4,861,215
[45] Date of Patent: * Aug. 29, 1989

[54] BULK STORAGE BIN WITH PNEUMATICALLY ASSISTED DISCHARGE

[75] Inventor: Timothy C. Bonerb, East Aurora, N.Y.

[73] Assignee: Flexair, Inc., East Aurora, N.Y.

[*] Notice: The portion of the term of this patent subsequent to Feb. 2, 2005 has been disclaimed.

[21] Appl. No.: 171,459

[22] Filed: Mar. 21, 1988

Related U.S. Application Data

[63] Continuation-in-part of Ser. No. 142,744, Jan. 11, 1988, which is a continuation-in-part of Ser. No. 33,744, Apr. 3, 1987, Pat. No. 4,722,655.

[51] Int. Cl.$^4$ .............................. B60P 1/16; B60P 1/56
[52] U.S. Cl. ..................................... 414/288; 105/243; 222/55; 222/61; 222/386.5; 296/181; 298/1 B; 298/24; 414/469; 414/470
[58] Field of Search ............... 414/288, 291, 304, 323, 414/325-329, 469-473, 491, 495, 519, 520, 539, 526; 105/243, 247, 239, 255, 358-361, 363; 298/1 B, 24; 296/39 R, 181, 100, 183; 222/61, 63, 64, 95, 105, 161, 181, 183, 185, 386.5, 55, 389; 410/117, 118; 198/524, 573, 856

[56] References Cited

U.S. PATENT DOCUMENTS

| | | | |
|---|---|---|---|
| 3,199,726 | 8/1965 | Pierson | 222/386.5 X |
| 3,283,925 | 11/1966 | Gutekunst | 414/288 |
| 3,756,469 | 9/1973 | Clark et al. | 105/243 X |
| 4,487,335 | 12/1984 | Bonerb | 222/63 X |
| 4,545,611 | 10/1985 | Broadbent | 296/183 X |
| 4,616,573 | 10/1986 | Giaier et al. | 414/327 X |
| 4,678,389 | 7/1987 | Bonerb | 105/359 X |
| 4,722,655 | 2/1988 | Bonerb | 414/288 |

FOREIGN PATENT DOCUMENTS 921990 4/1982 U.S.S.R. .............................. 414/288

Primary Examiner—David A. Bucci
Attorney, Agent, or Firm—Bernard, Rothwell & Brown

[57] ABSTRACT

A bin for storing and handling bulk material includes a fill opening through which material is introduced into the bin for storage and a discharge opening in a bottom portion of the bin through which material stored in the bin is discharged. The bin includes a primary bin support frame, and has at least one dump assembly with a bin floor panel that is hinged adjacent the discharge opening of the bin. The bin floor panel is pivotable from a generally horizontal position to an angled position for dumping bulk material into the discharge opening. The dump assembly includes a selectively collapsible secondary frame connected to the bin floor panel and pivotable with the bin floor panel. The bin further includes a flexible and collapsible bin wall portion connected to the primary and secondary frames and the bin floor panel to form an enclosure for storage of bulk materials. The flexible bin wall portion is supported in an erect position by the primary and secondary frames for storage and discharge of bulk materials. The bin includes an inflatable bag underlying the bin floor panel for inclining the floor panel toward the discharge opening and thereby directing bulk material stored in the bin through the discharge opening. The bin further includes a rigid lifting shield underlying the inflatable bag, and a hoist for raising the rigid lifting shield to a bin storage position with the secondary frame and the flexible bin wall collapsed.

18 Claims, 21 Drawing Sheets

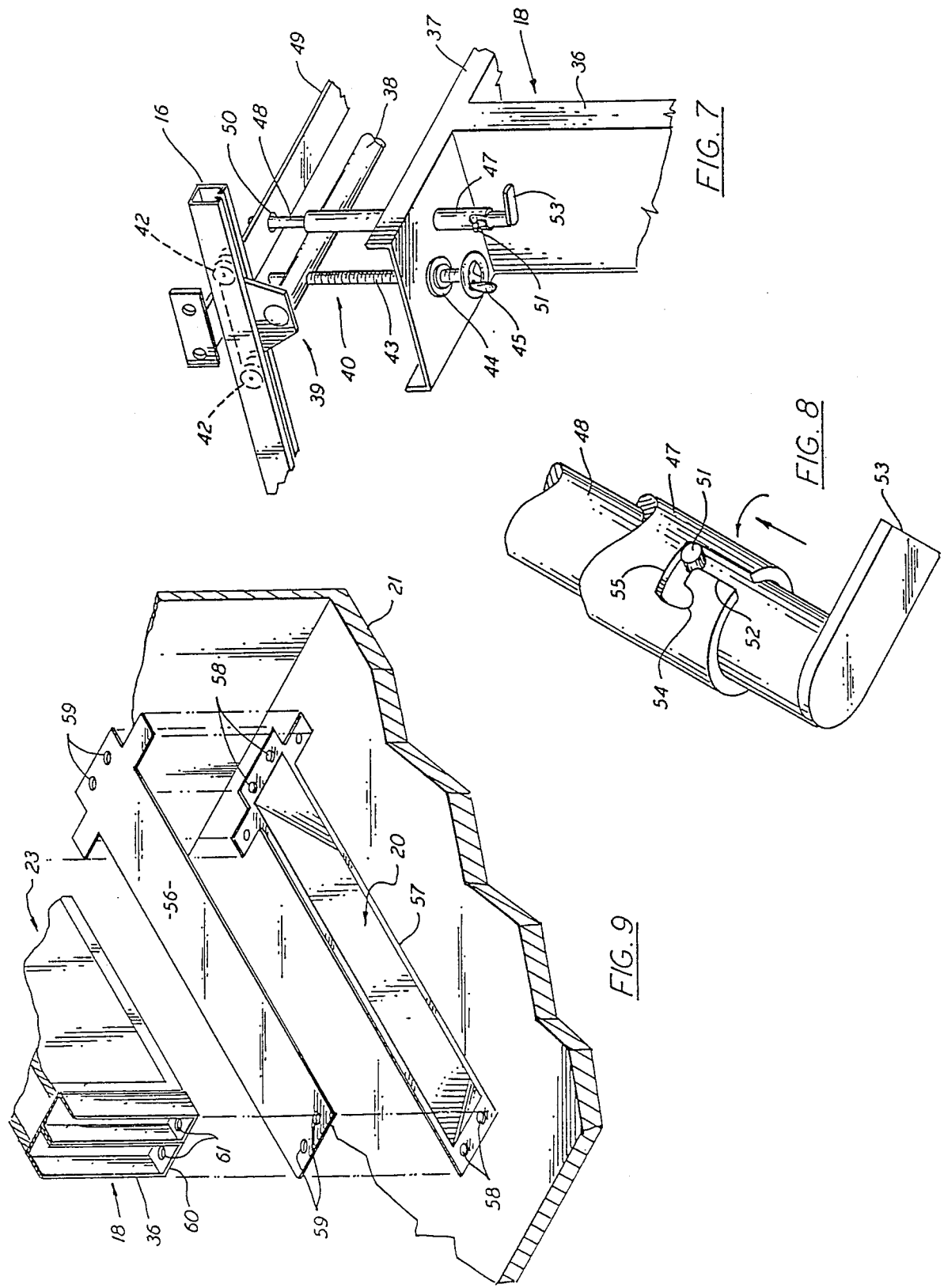

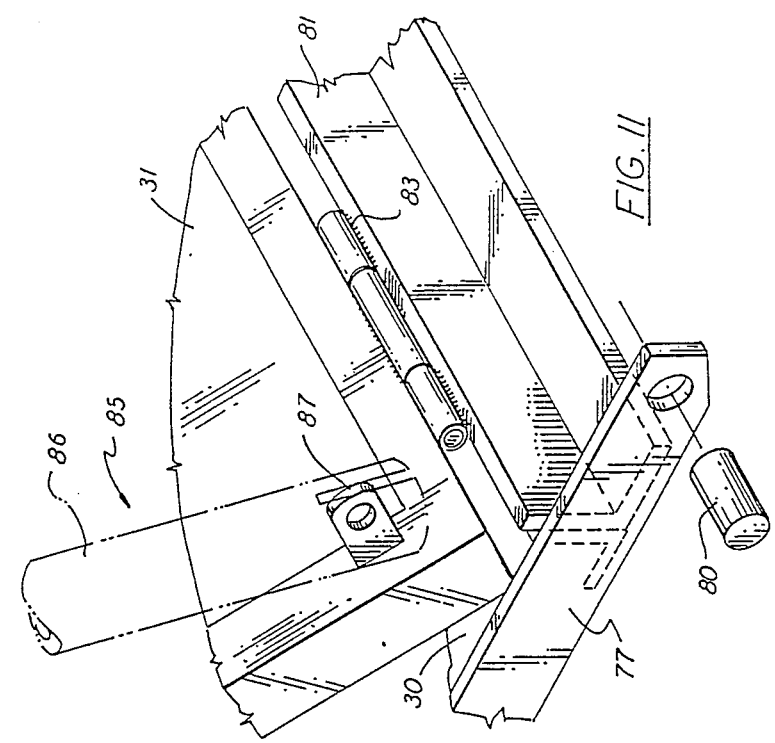
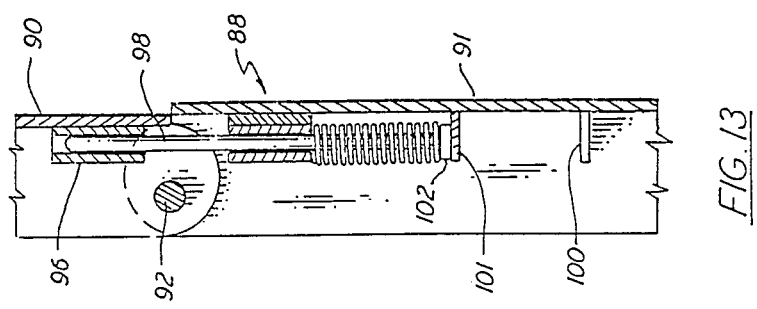
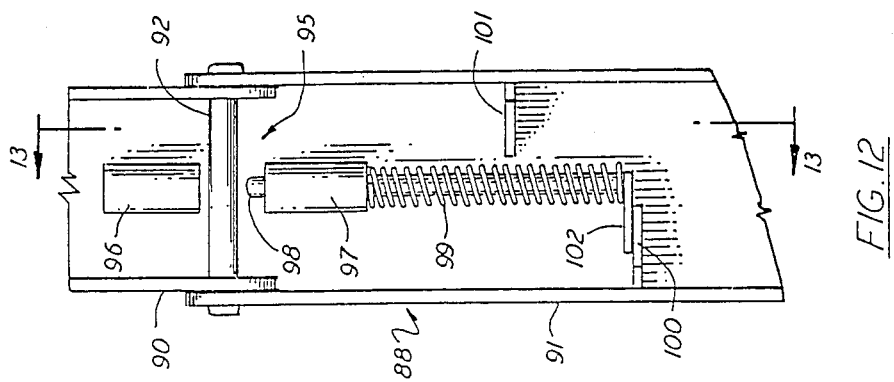

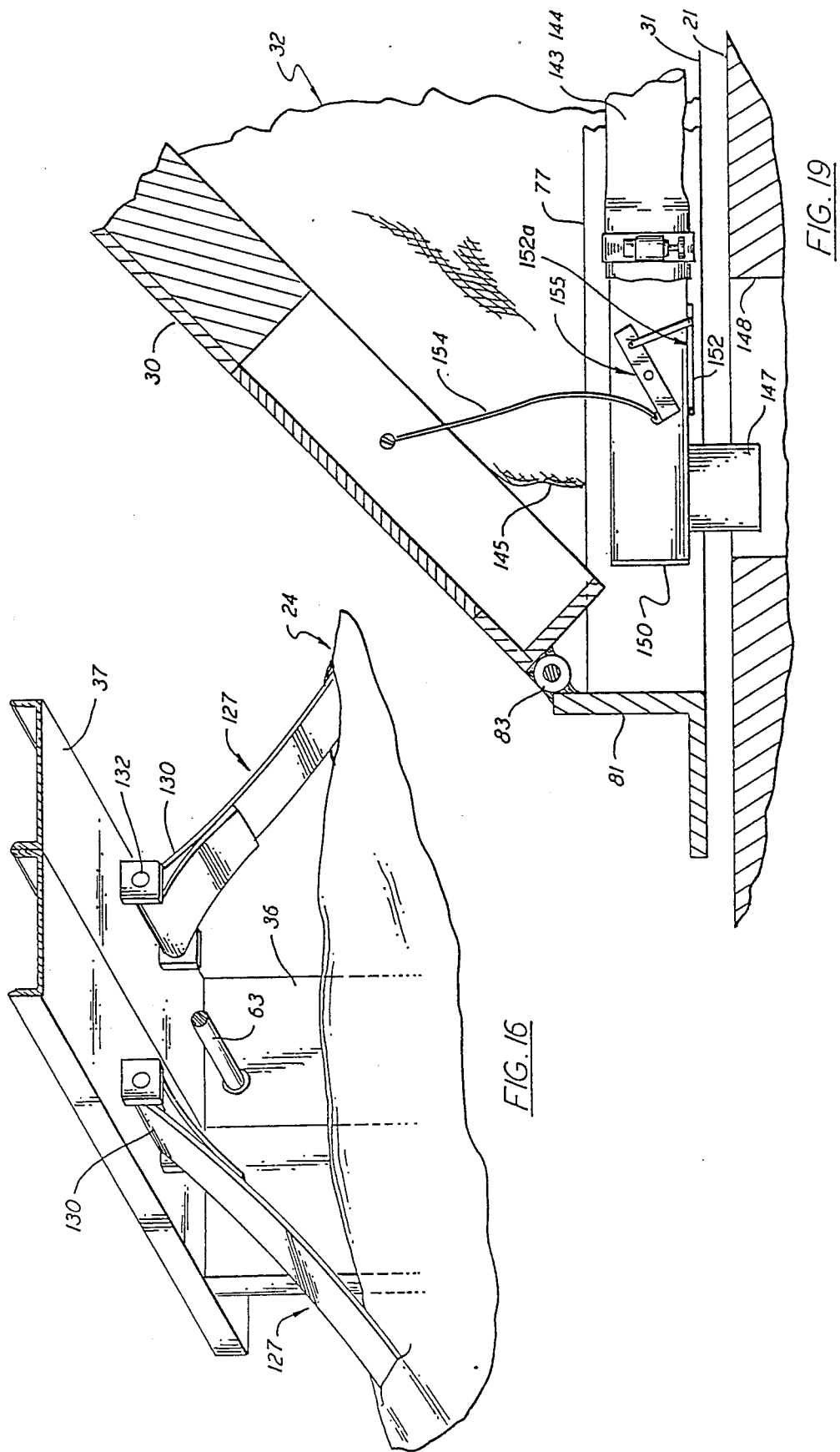

BULK STORAGE BIN WITH PNEUMATICALLY ASSISTED DISCHARGE

BACKGROUND OF THE INVENTION

CROSS-REFERENCE TO RELATED APPLICATION

The present application is a continuation-in-part of application Ser. No. 142,744, filed Jan. 11, 1988, which is a continuation-in-part application of Ser. No. 033,744, filed Apr. 3, 1987, now U.S. Pat. No. 4,722,655.

FIELD OF THE INVENTION

The present invention relates to a pneumatically assisted bulk storage bin.

DESCRIPTION OF THE BACKGROUND ART

Granular material in bulk form, such as sugar, grains and the like, often are stored in stationary silos and transported in specially designed bulk freight vehicles. Such storage and transport containers often have rigid walls and bottoms made of metal or some other rigid material. A discharge port generally is provided in the bottom of such a container, which, when opened, permits the material in the container to flow out. From the discharge port, the material may be conveyed by any suitable conveying means. If the bottom of the container, extending from the discharge port to the walls, is flat or horizontal, not all of the granular material will be discharged through the discharge port by gravity. It is a characteristic of granular material contained in a flat-bottomed container to stop flowing out of a discharge port when the material remaining in the container is at an angle of repose. The material remaining in the container after discharge by gravity often forms a cone shape inside the container. The inner face of this cone shape, formed by the granular material, extends from the discharge port in the bottom of the container upward at an angle to the wall of the container. The angle of repose at which this cone shape occurs and discharge by gravity ends depends on the physical characteristics of the bulk material involved.

To facilitate the discharge of the entire content of a bulk storage container, silos and bulk freight vehicles often are provided with hopper bottoms. Such hopper bottoms are generally cone-shaped, extending upwardly from the discharge port at an angle towards the bulk container walls. The angle at which the hopper bottom projects from the discharge port to the walls of the storage container is intended to be sufficient to prevent the material in the bin from resting in a cone shape at an angle of repose and to avoid bridging, rat-holing and the like of the material so that the entire contents of the storage container is directed towards the discharge port for removal. A storage container with a hopper bottom has a higher center of gravity than the same sized bin with a flat bottom. This higher center of gravity may not be a significant problem in stationary silos, but may be of greater importance in a mobile bulk freight vehicle. Moreover, a hopper-shaped storage container is expensive and wasteful of space.

It is highly desirable to have a cargo space of a freight vehicle that would be suitable for handling either bulk goods or piece goods such as palletized packages and the like. The obvious advantage is that the same cargo space on the same vehicle could handle either of these two significantly different types of loads. Convertibility of cargo space provides extreme flexibility and avoids empty runs of the vehicle. For example, a truck-trailer could handle piece goods such as palletized bags of sugar on one run and on a return run could handle bulk goods such as sugar in the bulk going back to the packaging factory; a plastics company could send finished goods in standard cargo space and return with a bulk load of resins; a brewer could send kegs or cases of beer and bring back malt or grains in the same vehicle, and there are many other uses of a similar nature.

The economic advantages of convertible freight vehicles have sparked an increased interest therein in recent years. For example, a van sold by Converta-Vans, Inc. of Wescoville, Pennsylvania, provides a cargo space with four separate convertible bulk hoppers covered by hinged floor sections in the piece goods mode, the hinged floor sections being raisable to provide wall sections that slope towards the hoppers in the bulk mode for gravity discharge of bulk materials through the hoppers. These hoppers make the van expensive and heavy, and the weight contributes to the energy expenditure of hauling. Also, the hinged floor sections that form sloping walls in the bulk mode raise the center of gravity of the load. Moreover, general cargo vans are not easily converted to the Converta-Van configuration due to the necessity of providing the hoppers.

Other hopper-type freight vehicles that are convertible from a bulk-handling mode to a piece goods handling mode are shown in U.S. Pat. Nos. 3,738,511; 3,756,469; 4,092,051; 4,155,469 and 4,606,570.

One proposal for a convertible freight vehicle that avoids the necessity of hoppers is shown in U.S. Pat. No. 2,712,797 to Woehrle et al. In Woehrle, a cargo space for piece goods in a van-type body is converted to a cargo space suitable for the transportation of bulk good by providing a liner for the cargo space with a rear discharge spout. For discharge of bulk materials, the van-type body of the freight vehicle is tiltable in the manner of a dump truck. However, a tilting mechanism that tilts an entire loaded van-type body would necessarily be quite expensive and add considerable undesired weight to the vehicle.

A freight vehicle with a convertible cargo space that requires neither a hopper bottom nor a dump truck-like tilting mechanism is shown in U.S. Pat. No. 4,534,596 to Timothy C. Bonerb, the inventor of the present invention. The freight vehicle disclosed in U.S. Pat. No. 4,534,596 modifies a conventional cargo space for piece goods by providing openings in the roof and floor for filling and discharging bulk material. One or more double-walled inflatable bags having their bottoms attached to rigid support platforms are positioned in erected condition to handle bulk material and are movable to a stored position near the roof of the cargo space to allow handling of piece goods.

Other bulk unloading systems that do not require fixed hoppers are shown in U.S. Pat. Nos. 4,541,765 to Moore and 2,829,803 to Paton. The Moore apparatus includes a collapsible rectangular liner having a collapsible funnel-shaped base wherein after partial discharge, the collapsible liner is raised to extend the collapsible funnel-shaped base above the angle of repose of the bulk material and thereby complete discharge of the bulk material. The Paton system employs a flat bottom and flexible walls, and means for changing the relative pressure between air within the container and are on the outer surface of the flexible walls of the container. This change in relative air pressure causes inward movement of the flexible walls which raises the flat bottom portion thereby sloping the flat bottom portion to complete discharge of the bulk material.

Other dump-type systems are known in the art. For example, a mechanically actuated dump system for emptying a freight vehicle through a fixed hopper is shown in U.S. Pat. No. 612,053. Dump systems showing inflatable tilting means are shown in U.S. Pat. Nos. 3,659,899; 3,711,157; 3,784,255 and 4,572,579.

There remains a need in the art for improvements in bulk storage bins.

SUMMARY OF THE INVENTION

In accordance with the present invention, a bin for storing and handling bulk material includes a fill opening through which material is introduced into the bin for storage, and a discharge opening in a bottom portion of the bin through which material stored in the bin is discharged. The bin includes a primary bin support frame, and has at least one dump assembly with a bin floor panel that is hinged adjacent the discharge opening of the bin. The bin floor panel is pivotable from a position at rest for loading the bin to a position inclined toward the discharge opening for dumping bulk material into the discharge opening. The dump assembly includes a rigid secondary frame connected to the bin floor panel and pivotable with the bin floor panel. The bin further includes a flexible bin wall portion connected to the primary and secondary frames and to the bin floor panel to form an enclosure for storage of bulk materials. The flexible bin wall portion is supported in an erect configuration by the primary and secondary frames for storage and discharge of bulk materials. The bin further includes an inflatable bag underlying the bin floor panel for inclining the floor panel toward the discharge opening and thereby directing bulk material stored in the bin through the discharge opening.

BRIEF DESCRIPTION OF THE DRAWINGS

FIG. 7 is an enlarged partial perspective view with portions broken away showing details of the frame of a bulk storage unit of FIGS. 1-4 suspended from an overhead carriage.

FIG. 8 is a perspective view with portions broken away showing details of an extendable locking bar that is mounted in the frame for registering and locking the frame over a discharge trough.

FIG. 9 is a perspective view with portions broken away of a discharge trough and cover plate assembly used in association with a bulk storage bin.

FIG. 11 is a perspective view with portions broken away showing details of the hinged section of the wall unit.

FIG. 12 is an elevation view with portions broken away showing details of the foldable support system used to hang the flexible wall bin.

FIG. 13 is a cross-sectional view of the foldable support shown in FIG. 12.

FIG. 16 is an enlarged perspective view with portions broken away showing details of the straps used to suspend flexible wall portion of the bin between the frame a foldable support system.

FIG. 19 is an enlarged side elevation view in partial section with portions broken away showing details of the inflation control system of the air bag.

DETAILED DESCRIPTION OF THE PREFERRED EMBODIMENTS

Figure 1:
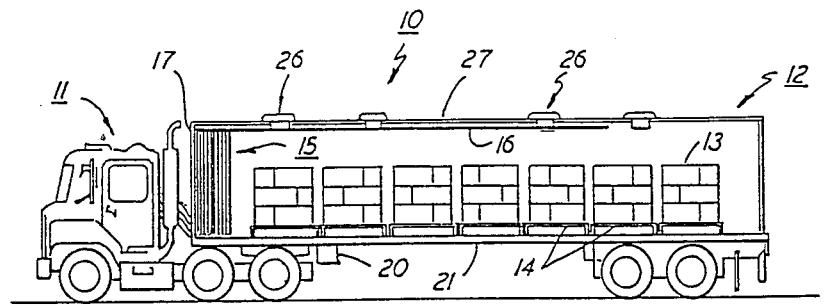
FIGS. 1-4 are side views, with wall portions broken away for clarity, showing a freight vehicle that is equipped with a pair of flexible walled bulk storage bins according to one embodiment of the present invention that can be stored in the nose of the freight vehicle and repositioned and erected to convert the freight vehicle from a piece goods transport mode to a bulk goods transport mode.
Figure 2:
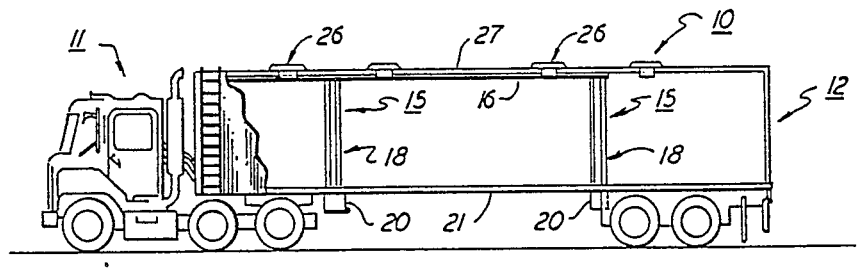

Referring initially to FIGS. 1-4, there is shown a freight vehicle 10 that in the embodiment illustrated includes a tractor 11 having an engine and drive wheels, and a detachable cargo container 12 in the form of a semi-trailer, although it could be any other cargo space such as a rail car or the like. In the embodiment shown, the container is rectangular in shape and is dimensioned to permit it to be transported over the roads or to be carried piggyback on either a train or a ship as may be required. In FIG. 1, the container is shown loaded with piece goods 13 that are stacked upon pallets 14 and tied down in a conventional manner for shipping. Typically, the container is loaded at a manufacturer's plant and the goods transported to a buyers facility at some remote location where it is unloaded. Ideally, the empty container will then be reloaded on the return trip with raw materials needed in the production of the goods. However, many products, such as packaged foods, require the use of bulk materials in their manufacture. These bulk materials may include salt, sugar, grains and the like, that normally cannot be easily handled using a conventional flat-bottomed container. Under these conditions, the container often is required to return empty.

A mobile cargo container 12 according to the invention is quickly converted to a bulk carrier for transporting, storing, handling and discharging bulk materials such as liquids, free-flowing materials or granular, powdered or flaked materials or grains of varying degrees of flowability or susceptibility to caking, bridging or ratholing.

In the embodiment shown in FIGS. 1-4, a pair of foldable bulk storage bins 15 are suspended on rails 16 secured to the top wall or roof 27 of the container. When not in use, the units can be stowed against the front wall 17 of the container as shown in FIG. 1. Each storage unit folds into a thin upright bin frame 18 that, for example, is about twelve inches wide and has a height that advantageously is slightly less than the interior height of the container. When stowed in the front of the container, the units take up very little cargo space and leave all but the very front of the container accessible for ready loading or unloading of cargo. To convert the cargo container to a bulk carrier, each unit is moved back along the rails to an operative position over a discharge area in the bed 21 of the container. In the embodiment shown, the discharge area in the bed is in the form of a slot-like trough 20 in the bed 21 of the container.

Figure 3:
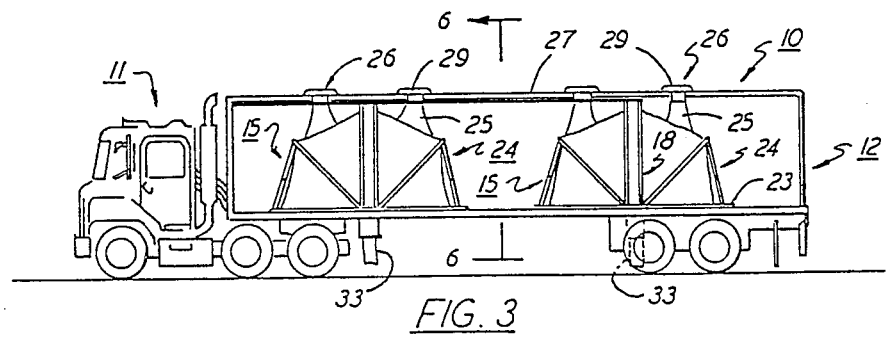

Once seated on the container bed over the troughs 20, the bins are unfolded as illustrated in FIG. 3, by lowering a pair of hinged opposing side assemblies 23 to a horizontal position against the bed 21. The lowering of the side assemblies 23 unfolds a flexible bin wall portion 24 into a relatively large tent-like structure that is capable of holding a quantity of bulk material. The walls of the bin are constructed of a flexible material that is lightweight, yet strong enough to retain a quantity of stored particulate material without rupturing. A pair of foldable loading funnels 25 are connected to corresponding fill openings in the top wall of each storage bin. The funnels are extended upwardly for loading through hatches 26 mounted in the roof 27 of the cargo container. Each hatch has a cover 29 that is removed during loading to permit a loading funnel to be brought out of the hatch. The raised funnels are folded over the hatch plates and the bulk material is gravity fed therethrough into the bins.

When the loading operation is completed, the funnels are closed off and folded back into the bins to prevent them from being damaged, and the hatch covers are closed.

Figure 4:
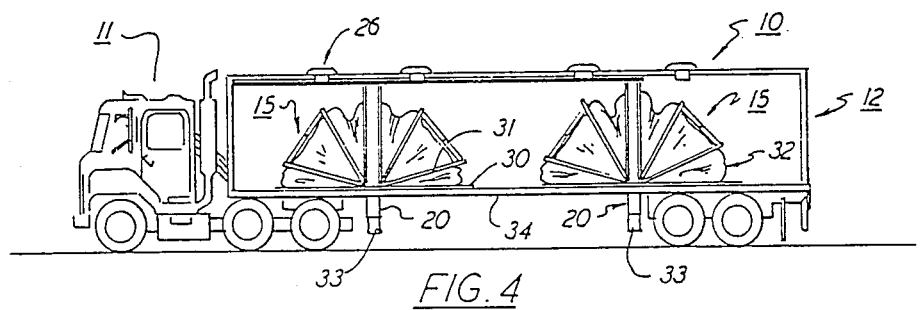

To unload the stored bulk material, a flexible spout 33 that is centrally positioned in the bottom of each bin and connected to the discharge opening of the bin is pulled through an aligned discharge trough in the bed of the trailer, and the bulk material is permitted to flow out of the bin to the extent allowed by gravity into an unloading conveyor (not shown). Each hinged side assembly 23 is comprised of an outer shield 31 that is hinged to a lower portion of the upright bin frame 18, and a dump assembly that includes an inner bin floor panel 30 that is independently hinged inside the outer shield adjacent the discharge opening of the bin and pivotable with the outer shield. An inflatable air bag 32 is mounted between each outer shield and the corresponding bin floor panel. The air bags 32 are sequentially filled with low pressure air to individually and gradually raise the floor panels to an inclined position as shown in FIG. 4. The inner floor panel thereby forms an inclined wall for directing stored bulk material contained in the bin through the discharge opening of the bin and the trough in the bed. After the unloading operation is completed, the spout is folded into the associated bin and stored therein. When not needed for bulk storage, the bins are folded into the positions shown in FIG. 2 by raising the outer shields to the vertical closed position and thereby folding the corresponding floor panels and associated flexible bin wall portions into the frames. The folded bin can then be stowed in the front of the freight container.

A bin in accordance with one embodiment of the invention will now be discussed in greater detail. According to this embodiment, the upright frame 18 of each storage bin includes a pair of spaced apart vertical side beams 35 and 36 that are joined by a horizontal top beam 37. See FIG. 6. The upright frame is suspended from the cross-member 38 of an overhead carriage 39 by a pair of threaded hangers 40 (shown in detail in FIG. 7) mounted in the outboard ends of the top beam 37. The carriage is supported in the overhead rails 16 upon rollers 42. The rails are secured by any suitable means in parallel alignment in either the roof or the sidewalls of the container and extend along the length of the container a sufficient distance to permit the two storage units to be conveyed from the stowed position at the front of the container to an operative position over one of the discharge troughs 20 to bring the discharge opening of the bin into alignment with the discharge trough 20 in the bed.

The shank 43 of each threaded hanger 40 is rotatably mounted in the cross-member 38 of the carriage so that it can turn freely therein. The lower portion of the shank is contained in a threaded bushing 44 carried in the top beam of the frame and a wheel 45 for turning the hanger 40 is connected to the lower part of the shank. By turning the hangers on opposite sides of a bin, the suspended frame can be lowered into seating contact against the bed of the container.

A hollow vertically disposed sleeve 47 is also carried at each end of the top beam 37 which slidably contains a locking bar 48. Alignment of locking bar 48 with sleeve 47 accurately positions the frame over a discharge trough, and stabilizes the frame when in an operative position. A stationary member 49 is affixed between the sidewalls of the container over each trough 20 and contains a locating hole 50 for receiving the locking bar 48 therein when the frame is registered over the trough. As best seen in FIGS. 7 and 8, the locking bar 48 has a radially disposed pin 51 that rides in a J-shaped slot 52 formed in the sleeve 47. A crank arm 53 is secured to the lower end of the rod by which the operator can move the rod within the sleeve. To register one of the storage bins over a discharge trough 20, the carriage is rolled along the rails until the frame is located over the trough. The locking bar 48 then is guided upwardly into the locating hole 50. The crank arm 53 then is rotated about its axis to guide the pin 51 laterally along horizontal passage 55 of the slot into seat 54 thus securing the bar in a locked condition. With the rod locked in place, the frame is lowered using the threaded hangers 40 to seat the frame upon the bed of the container with the discharge opening of the bin in alignment with the trough in the bed. The axial length of the locking bar 48 is such that it will not pass out of the locating hole 50 as the frame is being lowered to the bed.

As illustrated in FIG. 9, the entrance to each trough 20 is covered by a floor plate 56 when the bins are in a stowed position at the front of the freight container. The floor plate is fitted into a recess 57 which surrounds the trough entrance. Raised registration pins 58 are provided in each recess which are received in holes 59 formed in the floor plate. The floor plate is removed prior to locating a bulk storage bin over the trough. Each of the side beams 35 and 36 of the upright frame 18 contains a gusset plate 60 welded to the bottom thereof. Each gusset plate has a pair of registration holes 61 that slidably receive the registration pins 58 therein. As the frame is lowered from the carriage, the gusset plates are slipped into the recess 56 where they engage the registration pins to locate and lock the upright frame 18 in place over the trough.

The discharge trough 20 has an elongated slot-like entrance that extends laterally across the bed of the container. The width of the trough at the entrance is small enough so that the trough can be fitted between existing laterally disposed structural beams mounted in the bed of the container. The troughs usually can be fitted to existing containers without having to cut or otherwise rearrange the supporting beams thereby preserving the structural integrity of the container. Accordingly, an existing container will not be weakened or otherwise damaged by the installation of the present bulk storage system.

Figure 5:
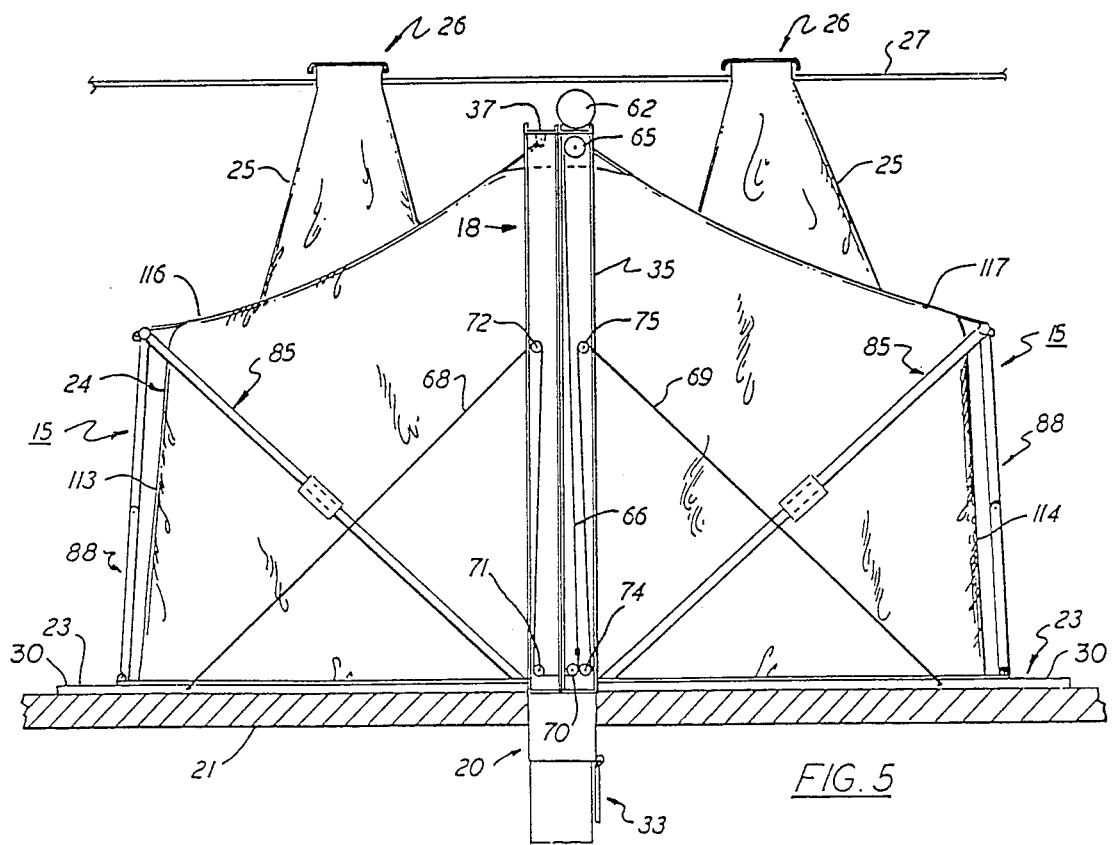
FIG. 5 is an enlarged side elevation view of one of the bulk storage bins of FIGS. 1-4 showing the bin in an unfolded condition inside the mobile cargo container with loading funnels and discharge spout of the flexible walled bin in an extended position.
Figure 6:
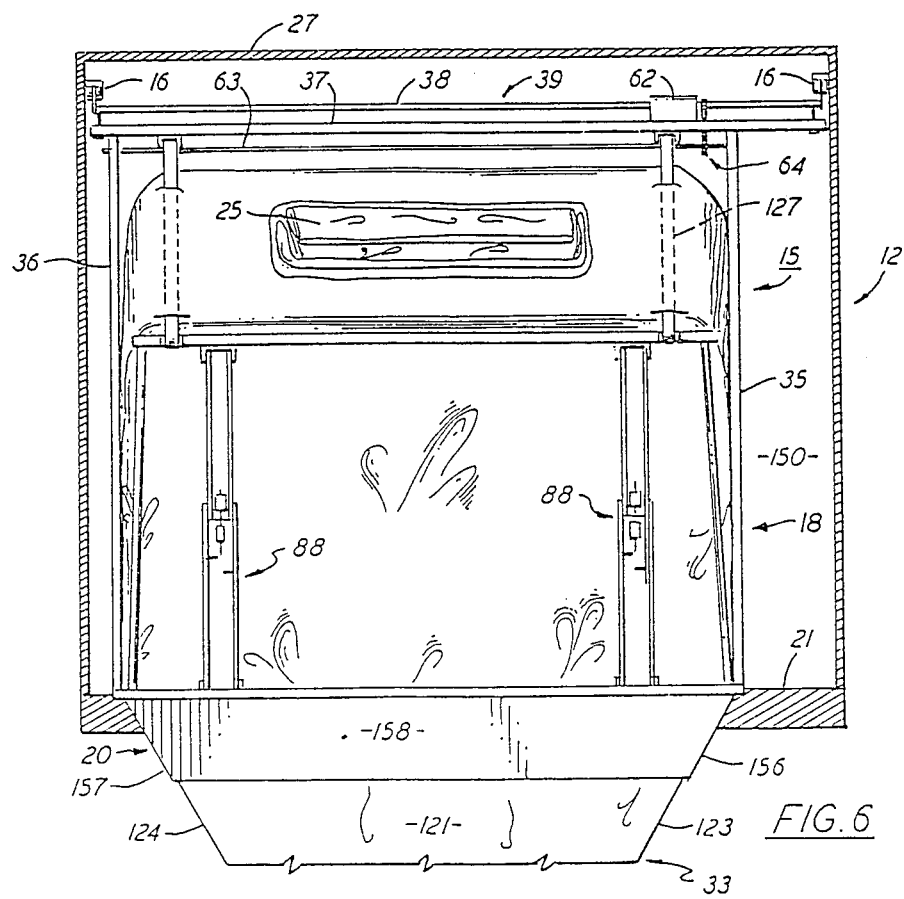
FIG. 6 is an enlarged end view taken along lines 6—6 in FIG. 3.

When a folded bin is seated over one of the troughs, it is opened by lowering the two opposing side assemblies 23 including outer shield 30 and bin floor panel 31 to a horizontal position in contact with the bed of the freight container. A reversible motor 62 is mounted upon the top beam 37 of the upright frame 18 as shown in FIGS. 5 and 6. The motor is connected to a horizontal drive shaft 63 by means of a gear train 64. The drive shaft, which is journaled for rotation in the opposed side beams 35 and 36 of the upright frame, passes through each side beam and has a sheave 65 keyed to each end of the shaft. A flexible belt 66 is wound upon each sheave and is attached at its lower end to a pair of cables 68 and 69. Cable 68 is trained over pulleys 70, 71 and 72 and is attached to the outside of the outer shield 30 of the left-hand side assembly as viewed in FIG. 5. Cable 69 is similarly trained over pulleys 74 and 75 and is attached to the outer shield 30 of the opposing side assembly. The belts are arranged on the sheaves 65 so that the two side assemblies are lowered and raised in unison in response to the reversible motor 62.

As noted above, the side assemblies 23 of each bulk storage bin contain an outer shield 30 and an inner bin floor panel 31. The outer shield 30 protects its associated inflatable bag from puncture by objects or projections on the bed of the freight container, and can be formed of any suitable material, such as lightweight sheet aluminum. Outer shield 30 has a raised lip 77 formed of angle iron that extends about its periphery. See FIG. 10. The bin floor panel 31 is formed of a suitably stiff, lightweight material, and is adapted to be recessed within the lip of the outer shield. The outer shield is pivotally supported between the horizontal beams 35 and 36 of the upright frame by means of opposed pivot pins 80 whereby the panel can be raised and lowered about the pin by the above-described cable system. See FIG. 11. A laterally disposed plate 81 is welded inside the lip of the outer shield and runs across the width of the shield. Spaced hinges 83 are secured to the top of the plate 81 which function to pivotally support the bin floor panel to the back of outer shield so that the floor panel can be moved independently within the side assembly.

A U-shaped tubular bracket 85 is pivotally mounted on the back of the floor panel by means of a pair of clevis units 86 that are spaced apart near the lower edge of the panel. See FIG. 10. The base leg 87 of the bracket is attached to the back edge of the floor panel by two foldable braces 88. As illustrated in FIGS. 12 and 13, braces 88 include an upper channel member 90 that is fitted inside a lower channel 91. The two members are joined by a shaft 92 so that each brace can be folded inwardly at about its midsection. The upper end of each column is pivotally attached to the base leg of the bracket by a clevis and pin unit 93 while the lower end of the column is similarly attached to the floor panel by a second clevis and pin unit 94. See FIG. 10.

Each foldable brace 88 is secured in a straight or unfolded condition by means of a manually operated latch mechanism generally referenced 95 (shown in detail in FIGS. 12 and 13). The latch mechanism includes a pair of sleeve members 96 and 97 welded to the inside of the opposed channels making up each brace. When the channels are rotated into an unfolded condition, the two sleeve members are in axial alignment. A locking bolt 98 is slidably contained within the lower sleeve member 97 and a spring 99 is wound about the lower part of the bolt. The spring acts between the lower sleeve member and the expanded head 102 of the bolt to urge the bolt into a release position as shown in FIG. 12. A first stop 100 is provided to intercept the bolt head and thus retain it in the release position. The brace is locked in an unfolded position as shown in FIG. 13 by sliding the bolt 98 upwardly into the upper sleeve member 96 and rotating the head of the bolt so that it now seats against a second raised stop 101.

Figure 14:
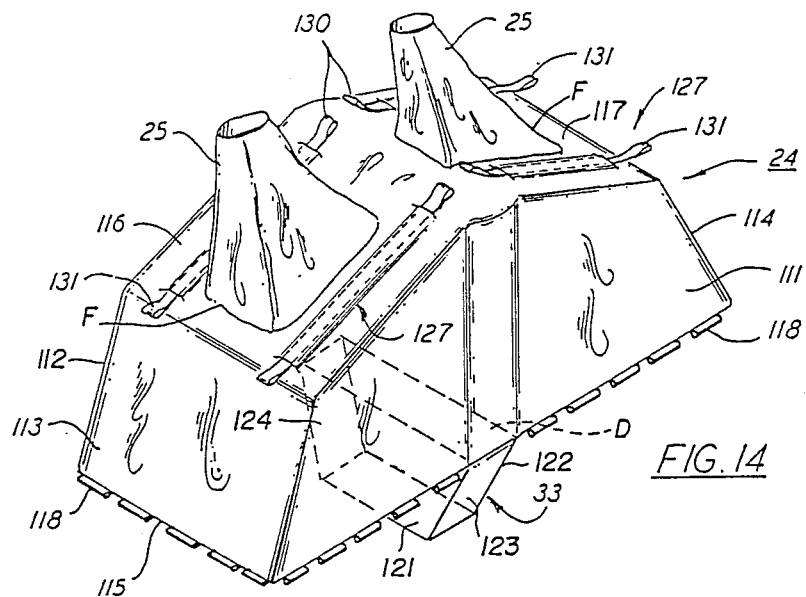
FIG. 14 is a perspective view showing the flexible wall portions of the bin in an unfolded condition, apart from the frame and other structural parts of the bin.
Figure 15:
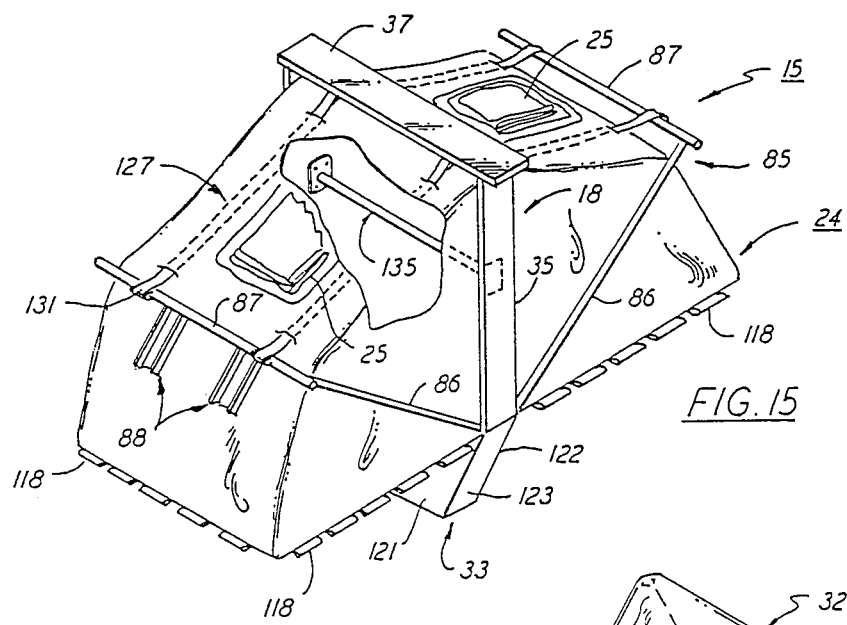
FIG. 15 is also a perspective view of the unfolded bin wall portion shown in FIG. 14 suspended between the frame and the foldable support system.

A flexible bin wall portion 24 is suspended between and connects the upright frame 18 and the bin floor panel 31 to form an enclosure for storage of bulk materials. The flexible bin wall portion 24 is foldable into the upright frame 18, and is illustrated in detail in FIGS. 14 and 15. The flexible bin wall portion 24 is shown in a fully extended condition in FIG. 14 and is comprised of a tent-like enclosed body that includes sidewalls 111 and 112, end walls 113 and 114, a floor 115 and two top wall sections 116 and 117. A series of spaced apart cylindrical tabs 118 are attached to the body of the flexible bin wall portion 24 about the perimeter of the floor 115. As will be explained below, the tabs are used to connect the bin to the opposed bin floor panels of each side assembly. A flexible funnel 25 is connected to a fill opening F in each top wall section 116 and 117. As shown in FIG. 3, the funnel can be raised through the roof hatches of the container to provide loading access to the bins.

The discharge spout 33 forms part of the bin floor and is centrally located in the floor. The spout is connected to the discharge opening D of the bin, and includes a pair of parallel sidewalls 121 and 122 and a pair of tapered end walls 123 and 124 which coact to give the spout a funnel-like configuration. As best seen in FIG. 6, the geometry of the spout complements the shape of the discharge trough 20. In practice, the spout is pulled through the trough so that it hangs below the bed of the container as shown in FIG. 21 to provide a fully extended discharge chute through which material stored in the bin can be emptied.

Figure 21:
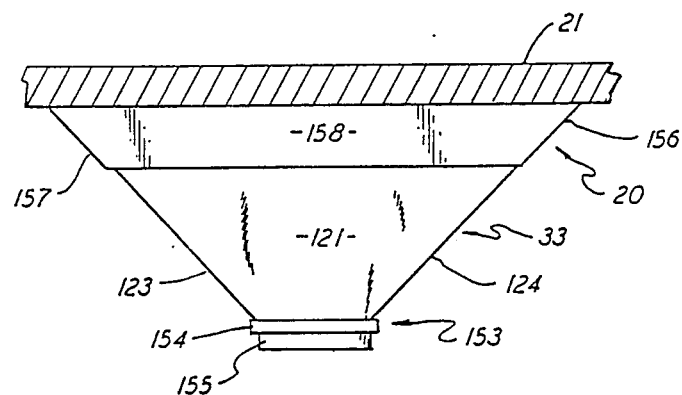
FIG. 21 is an elevation view showing the spout of a bin extending through a trough in the bed of a freight vehicle.

As shown in FIG. 21, the spout 33 of the flexible walled bin is pulled through a trough 20 in the bed 21 of a freight container. If desired, the trough can extend down about one half the distance from the bottom of the bed and the road surface upon which the wheels of the container ride. In the embodiment shown, the trough includes a pair of inwardly inclined end walls 156 and 157 that are joined to a pair of parallel walls 158 and 159. See FIGS. 18 and 21. The walls of the spout complement those of the trough so that the trough supports the entrance region to the spout when it is extended as shown. The spout is formed of the same flexible material as the bin and can be easily pulled through the trough when the bin is to be unloaded. After unloading, the spout is rolled up and passed back into the bin for safekeeping. Although not shown, elastic bands are attached to the floor of the bin at the spout entrance which are used to retain the stored spout inside the bin.

The spout terminates with a gate generally referenced 153 that can be opened and closed to control the release of particulate material from the bin into a conveyor or the like. See FIG. 21. The gate includes a rigid coupling 154 attached to the bottom of the spout and an adjustable diaphragm 155 mounted in the coupling. By turning the diaphragm in one direction, the discharge passageway of the spout can be adjusted between a fully closed position and a fully opened position. Although a diaphragm is shown in this embodiment of the invention, any suitable closure device such as a cap can be used in the practice of the present invention.

Figure 10:
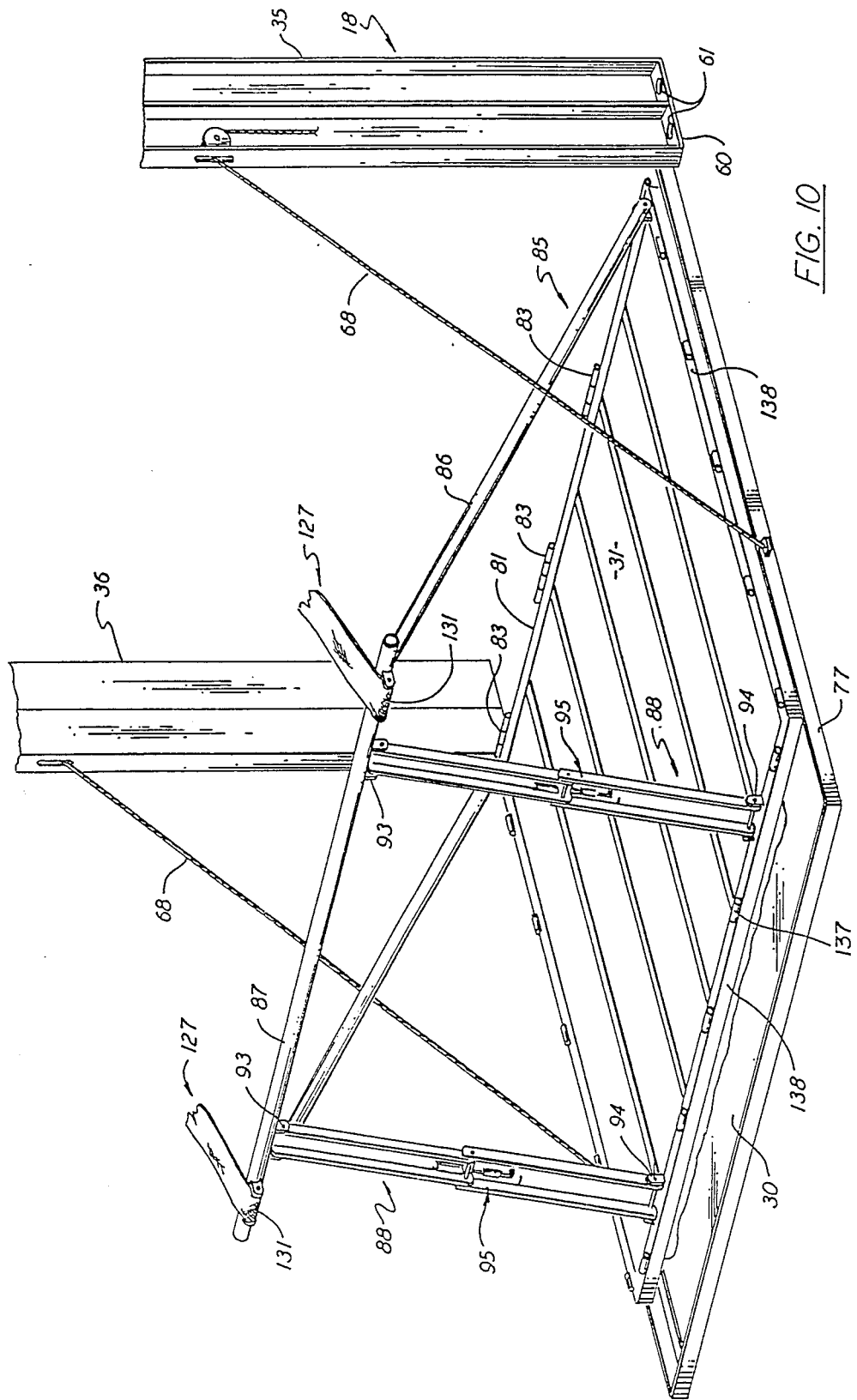
FIG. 10 is an enlarged perspective view, with portions broken away, showing details of the frame and a side assembly hinged thereto on one side, with the flexible wall portions of the bin removed from the frame.

Referring back to FIGS. 14 and 15, a pair of parallel straps 127 are affixed by any suitable means to each roof section of the bin. The upper end of each strap contains a loop 130 while the opposing lower end of each strap contains second loop 131. As shown in FIG. 16, the upper loop of each strap is secured to the top beam 37 of the upright support frame 18 within a bracket 132. The lower loop of each strap, in turn, is passed over the base leg 87 of bracket 85. See FIG. 15. The straps, in assembly, serve to limit the extent of travel of the opposed brackets 85 when the bin is unfolded and thus support the roof of the bin when it is in an open condition to maintain the flexible wall portion in an erect position. With the support in an operating position, the braces 88 are latched in an unfolded condition as shown in FIG. 10 to rigidly attach the brackets 85 to the bin floor panels 31. A reinforcing bar 135 may also be positioned inside the bin and attached between the two vertical beams of the main support frame to provide added structural strength to the system. See FIG. 15.

A "curtain rod" assembly means is utilized to attach the bin wall portion 24 to the floor panels 31. This "curtain rod" assembly includes tabs 118 that surround the bottom rim of the bin wall portion 24 and are positioned to fall between eyelets 137 secured about the outer perimeter of the floor panels. See FIG. 10. Slide bars 138 are passed through the aligned tabs 118 and eyelets 137 to securely hold the floor of the bin to each of the floor panels.

Figure 17:
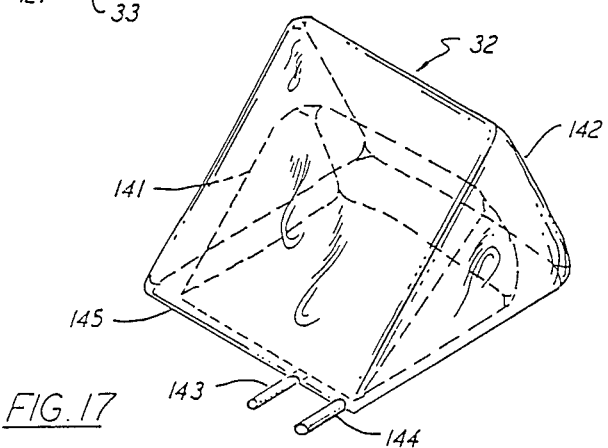
FIG. 17 is a perspective view of an inflatable air bag used to lift one of the floor panels of the bin.

An inflatable air bag 32 (shown in detail in FIG. 17) is secured by any appropriate means to the bottom of each floor panel so that it can act between the floor panel and the outer shield of each side assembly to tilt the floor panel towards the discharge opening of the bin. See FIGS. 18 and 19. Advantageously, the bag includes an inner bladder 141 and an outer bladder 142, having separate inflation lines 143 and 144, respectively. Inner bladder 141 provides a safety factor in the event that the outer bladder 142 ruptures, to prevent the floor panel from crashing down to the bed. In the embodiment shown, the bag is generally wedge-shaped with its apex 145 being located in assembly adjacent to the hinged edge 146 of the floor panel. Inflating the bag with low pressure air causes the floor panel to be pivoted about the hinges 83 to incline the floor panel toward the centrally located spout.

Low pressure air from a blower (not shown) is pumped into both bladders of the bag through air inlet tube 147. The tube is movably received in a hole 148 formed in the bed 21 of the container. The inlet tube is connected to a bifurcated distributor 150 (shown in more detail in FIG. 19) that empties into the inflation lines 143 and 144. A butterfly valve 152 is positioned in the distributor over pressure relief opening 152a. A lanyard 154 is attached at one end to the bin floor panel and at the other end to a lever arm mechanism 155 that is attached to the valve. When the inner floor panel reaches a predetermined angle with reference to the horizontal lifting shield (approximately 45°), the valve is opened to relieve the pressure inside the bag and thus prevent over pressurization of the bag.

Figure 18:
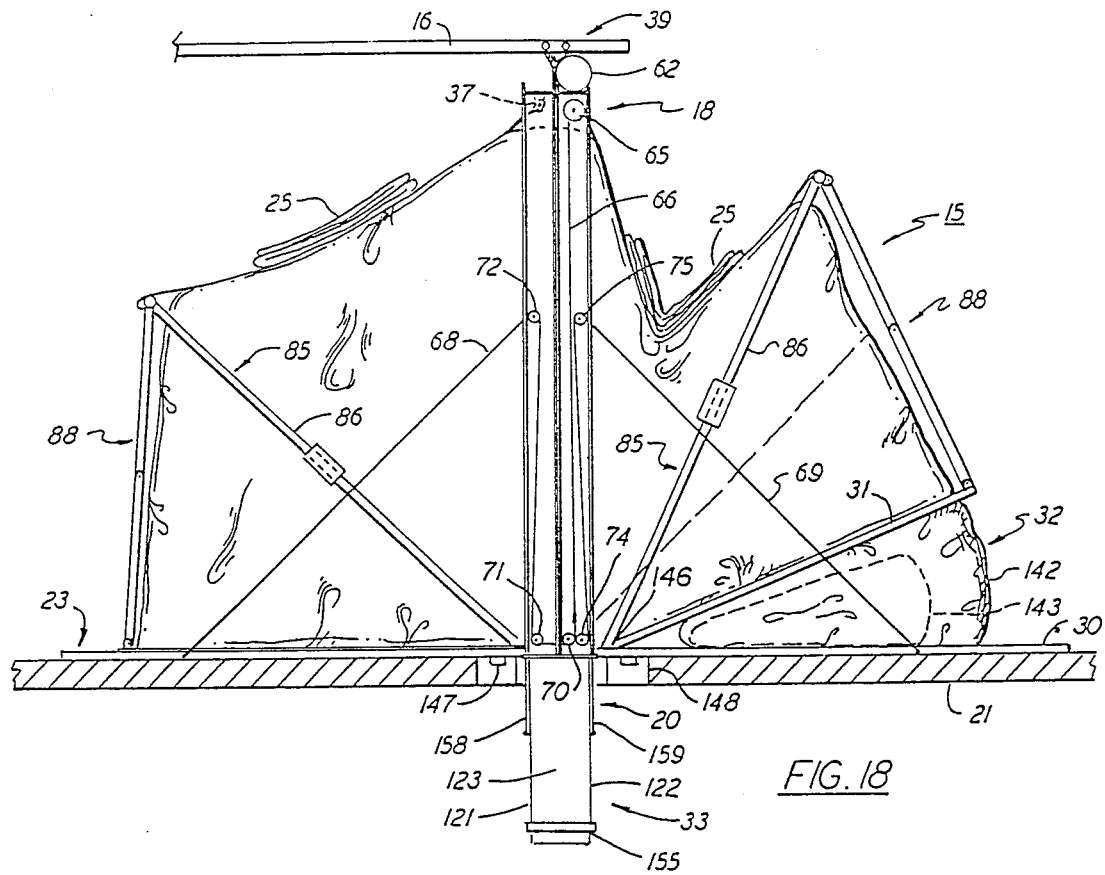
FIG. 18 is an enlarged side elevation view of a bulk storage bin according to the invention showing the inflated air bag lifting a floor panel.

As each floor panel is raised by the air bag during the bulk material unloading operation, the latched braces 88 apply a lifting action against the bracket 85 and, as a result, the entire lower section of the bin on one side of the frame is tipped toward the discharge spout as shown in FIG. 18. The air bags will continue to incline the floor panel to cause the material to flow. In this manner both sides of the bin can be sequentially emptied in a very short period of time.

Figure 20:
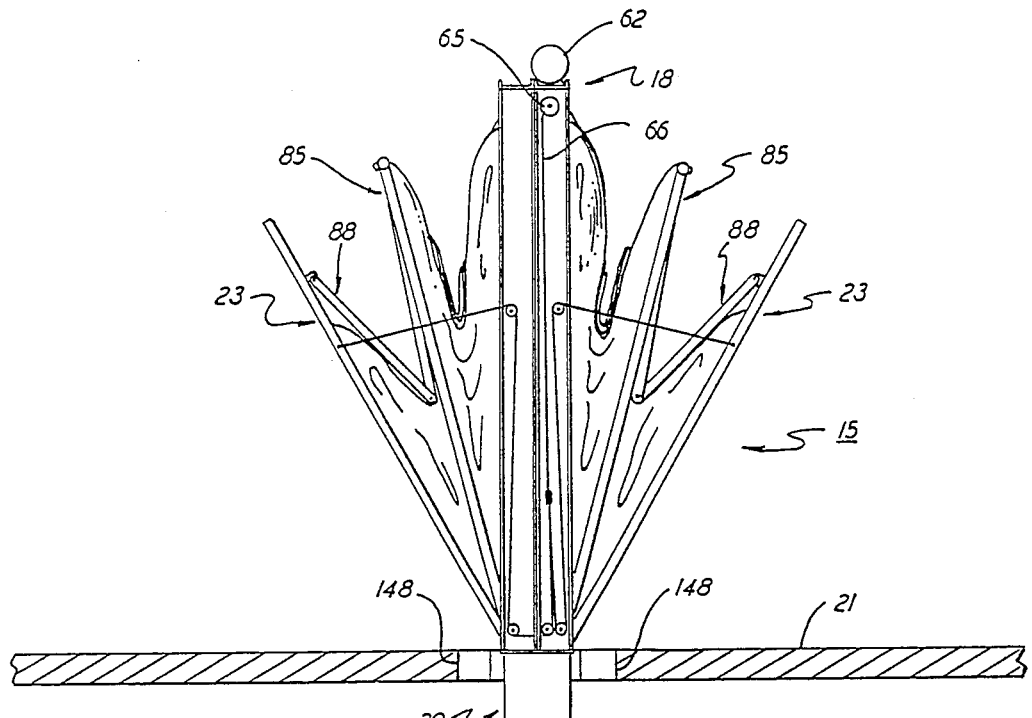
FIG. 20 is a side elevation view showing a bulk storage bin as it is being folded into the frame assembly.

With reference to FIG. 20, the foldable storage bin of the present invention is folded within the narrow upright frame 18 when the side assemblies are raised by the motor-actuated cable and pulley system. The two opposed side assemblies are arranged to close against the sides of the frame to protect the stored bin from damage. The closed frames can be easily moved to a desired stowed location within the mobile cargo container. Preferably, the units are stowed against the front wall of the unit so that cargo and cargo-handling equipment can freely and safely be moved about the container.

When utilized in a cargo container, the rectangular shaped bins allow for maximum utilization of space. As seen in FIG. 6, an aisle space 150 is provided between one sidewall of the freight container and the opposing sidewall of the bin to enable an operator to pass around a bin when the bin is in the operating position. In practice, the aisle space between the bins and the walls of the container are staggered between adjacent bins to more evenly distribute the cargo weight over the wheels.

Figure 22:
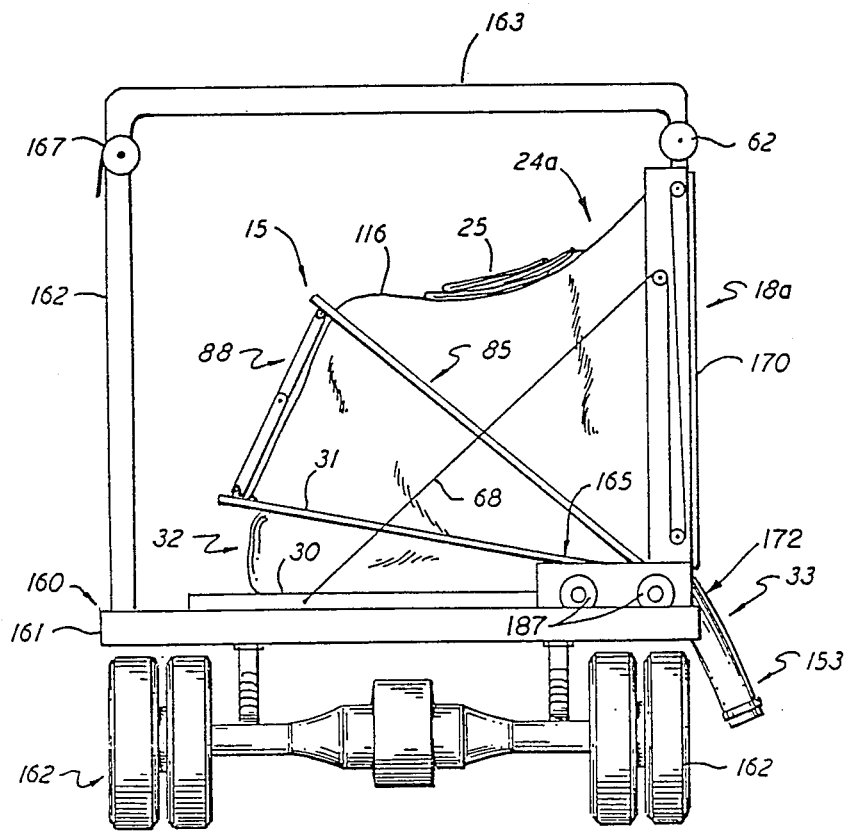
FIG. 22 is an end elevation view showing another embodiment of the invention where a half bin unit is mounted on the side of a flat bed trailer.

Another embodiment of the invention is illustrated in FIG. 22 wherein previously noted parts are referenced with like numbers. In this embodiment, one or more bulk storage units are mounted on a flat bed trailer generally referenced 160. The trailer includes a horizontal bed 161 that is supported by wheels 162 so that it can be transported over the ground. A roof section 163 is supported above the bed upon an open-sided frame 164. Roll-up curtains 167 are suspended from the roof section which can be dropped to enclose the trailer. This type of open-sided trailer is widely used in many geographical areas and has the advantage of being able to be loaded and unloaded from any side.

The storage unit 15 in this embodiment is turned sideways on the bed so that one side of the frame upright 18a is positioned along one side of the trailer. This side of the frame s closed by a fixed wall 170 that provides a discharge slot or opening in the bottom portion thereof for discharge of bulk material from the bin. The opposite side of the frame which faces the bed includes a previously described side assembly comprised of an outer shield 30 and bin floor panel 31 combination that is movable between an open position as shown and a closed position against the side of the frame 18a. Bracket 85 and foldable braces 88 are attached to the bin floor panel as described above and provide a foldable support structure for the flexible bin wall portion 24a.

The frame 18a is mounted upon a carriage 165 for movement about the bed between a stowed position and the operative position as shown. The carriage may include wheels 187 that ride on the floor of the bed. A suitable breaking system is also included to secure the carriage against movement when in either the stowed or operative position. When in the operative position as shown, the spout 33 is released from the bin and pulled through the discharge slot and over the side of the trailer into a discharge area 172 where it can be connected to a conveyor or deposited in a collecting trough (not shown). A number of half units can be mounted side-by-side along the length of the flat bed in a reversed staggered arrangement so that the spouts of alternate units hang down on opposite sides of the trailer.

Because of the unique unloading characteristics of bins according to this invention, the bins can be substantially completely emptied of material during the unloading operations. The support structure provided by bracket 85 and latched braces 88 avoids fold formation in the flexible wall portion of the bin contacting the bulk material being emptied to prevent the bulk material from being trapped in the flexible bin. The bins of the present invention can be quickly erected, or folded and stowed, when desired with a minimum amount of manual effort. Furthermore, the flexible wall portion of the bin of the present invention can be easily detached from the frame and replaced in a matter of minutes, thereby completely avoiding the risk of contamination when transporting such diverse materials as sugar, liquid fructose, and fertilizer. When stowed, the bins take up an extremely small amount of space in the front of the freight container, and the flexible walls and air bags of the bins are protected by the outer shields from damage.

The present invention also is applicable to a convertible system that is stowable in the ceiling of a freight vehicle. See FIGS. 37-41. This embodiment utilizes a rigid lifting shield 421 that underlies the pivotable bin floor panels 414 of each dump assembly, with the associated pneumatically inflatable air bag positioned between the rigid lifting shield 421 and the bin floor panel 414.

In accordance with this embodiment, means are provided for raising the rigid lifting shield to a bin stowage position adjacent the roof of a freight vehicle, with the secondary frame of each dump assembly and the flexible bin wall collapsed.

According to this embodiment, the hoisting means can be supported by the primary bin support frame 410 which can be connected to the side walls 411 of the freight vehicle.

The hoisting means may include a live axle 400 connected to a motor 401 by means of a chain drive and sprocket system or gears 402. The live axle 400 includes at least two spools 403 about which are wound respective lifting straps 404 that pass through pulleys 405 and are fixedly connected to the lifting shield 421, as shown in FIGS. 38-41.

Figure 39:
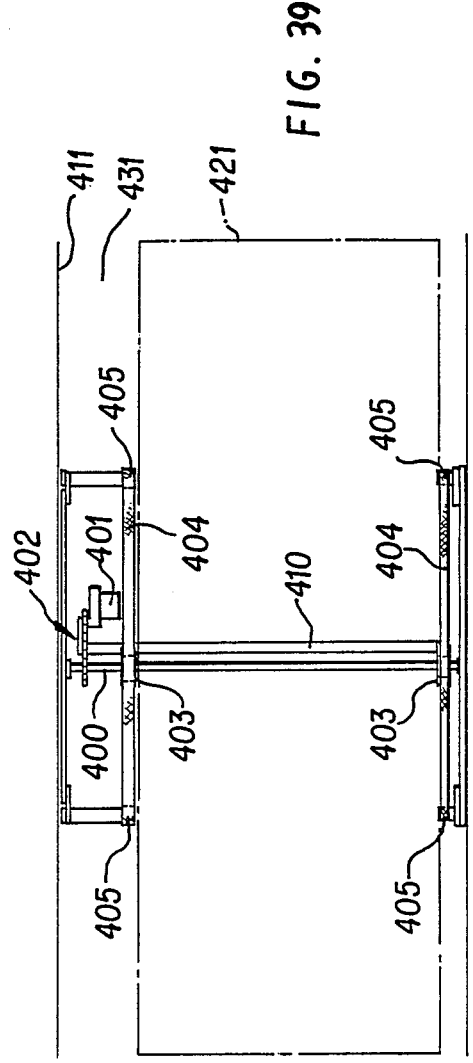
FIG. 39 is a schematic top elevation view of the primary bin support frame and hoisting means shown in FIG. 38 showing the lifting platform outlined in phantom lines.
Figure 40:
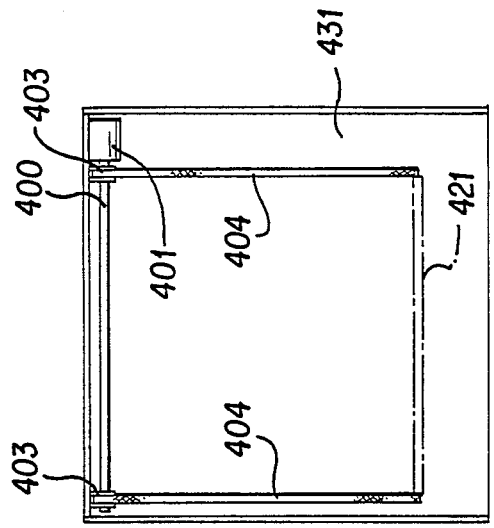
FIG. 40 is a schematic end elevation view showing the primary bin support frame and hoisting means shown in FIG. 38 showing a partially raised lifting platform in phantom lines with other parts of the bin left out for clarity.
Figure 38:
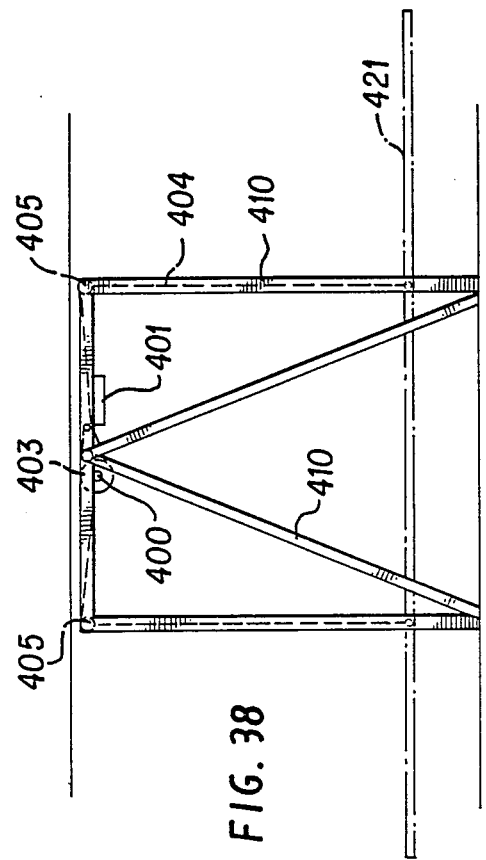
FIG. 38 is a schematic side elevation view showing primary bin support frame and hoisting means for raising or erecting a ceiling-stored convertible bin of the type illustrated in FIG. 37, showing a partially raised lifting platform in phantom lines with other parts of the bin left out for clarity.

As in the previously described nose-stored convertible freight vehicle embodiment, an access passageway 431 is provided on one side of each bin, as shown in FIGS. 39 and 40. FIGS. 38-40 show the lifting shield 421 in phantom lines in a partially raised condition.

Figure 41:
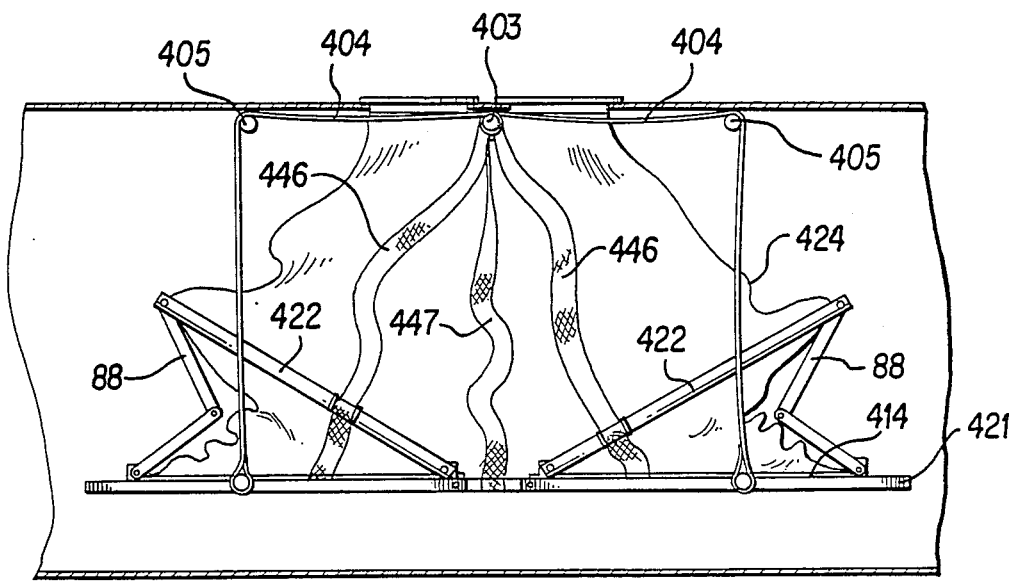
FIG. 41 is a partly schematic side elevation view of a partially hoisted convertible bin of the type shown in FIG. 37, with the primary bin support frame removed for clarity, showing collapsing of the bin secondary frame and the flexible bin wall portion.

FIG. 41 illustrates collapsing of the flexible bin wall portion 424 during raising of the rigid lifting shield to the bin storage position adjacent the roof of the freight vehicle so as to convert the cargo space to the piece goods handling mode. During raising of the bin, the secondary frame 416 of each dump assembly collapses. This is provided for in the embodiment shown by using foldable braces 88 as previously described in connection with the prior convertible bin embodiment that is stowed in the nose of a freight vehicle.

Figure 37:
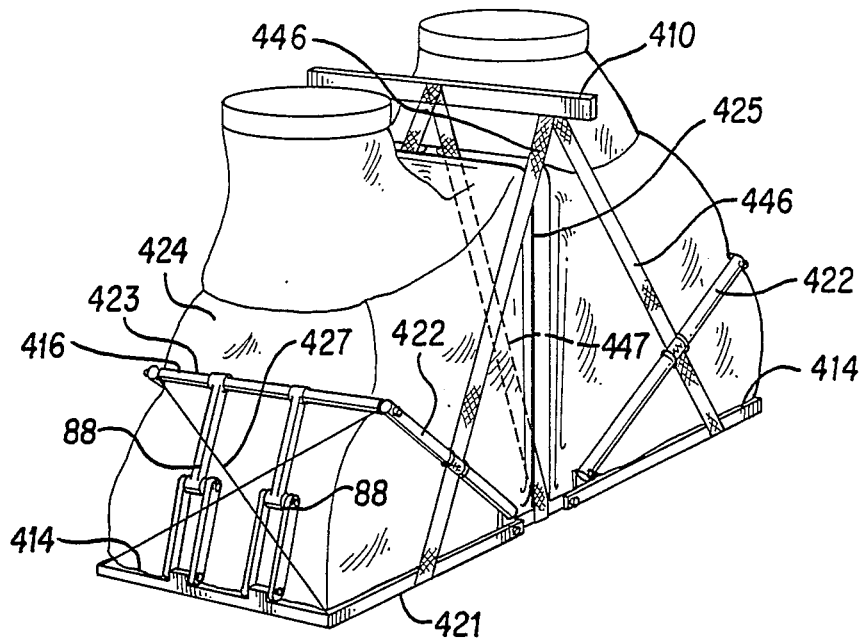
FIG. 37 is a perspective, somewhat schematic view of a bin according to another embodiment of the present invention that can be stored adjacent the ceiling of a freight vehicle and lowered for converting the freight vehicle from a piece goods transport mode to a bulk goods transport mode.

As shown in FIG. 37, the flexible side wall 424 of the bin is provided with a pleat 425 that allows the side wall to expand during hoisting of the bin to the stowage position, thereby permitting the secondary frames 416 to collapse. If desired, a plurality of pleats can be provided in the side wall of the flexible bin wall portion to provide for expansion of the bag and folding of the collapsible secondary frames during lifting. Alternatively, the flexible bin wall portion can be disconnected from the secondary frame of each dump assembly to allow the secondary frames to collapse.

Advantageously, independant means are provided for supporting the platform in the raised position to prevent strain on the lifting straps 404 during transport and use in the piece goods mode.

As shown in FIGS. 37 and 41, a plurality of side straps 446 are provided to limit bulging of the flexible bin wall portion when filled with bulk material. The side straps 446 are attached to side members 422 of the secondary frame, and connect each dump assembly to the primary frame. The centrally located webbing 447 also serves to hold the pleat 425 of the flexible bin side wall inwardly in the bulk handling mode.

With certain bulk materials being transported, especially liquids, the ends of the bin may tend to sway from side to side. One means for reducing such sway is to criss-cross the end of each dump assembly by connecting the ends of the U-shaped bracket to opposite sides of the respective bin floor panel with cables 427, as shown in FIG. 37. Other means for preventing swaying of the ends of the bin and bulging of the flexible bin wall portion can be provided if necessary or desired.

Advantageously, the flexible bin wall portion 424 is connected to secondary frame members 422 and 423 by "curtain rod" connectors including eyelets and slide bars. "Curtain rod" connectors also are utilized to attach the flexible bin wall portion 424 along the bottom edge thereof to the pivotable bin floor panels 414.

A convertible system that is stowable in the ceiling can also discharge to the side, as shown in FIG. 22, and other aspects of this embodiment can be as has been previously described in connection with the prior convertible embodiment that is stowed in the nose of a freight vehicle.

It will be readily seen that the present invention is not only applicable to convertible freight vehicles, but also to bins that can be selectively erected or stowed in stationary warehouses and the like when needed. The invention finds further applicability in converting pickup trucks and the like for bulk transport.

Figure 23:
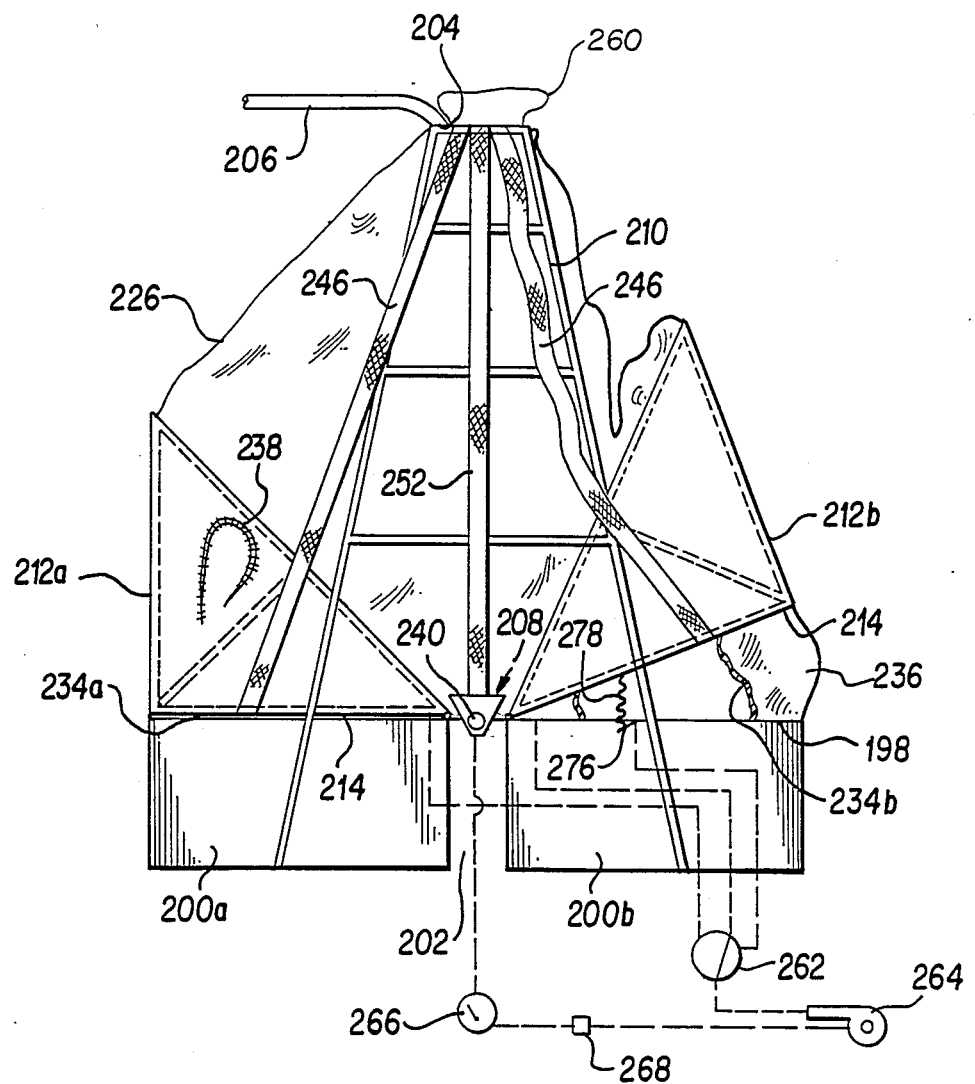
FIG. 23 is a side elevation view, partly schematic, showing a stationary bin in accordance with one embodiment of the present invention.

The invention is also applicable to stationary bins, one embodiment of which is shown in FIG. 23. In the embodiment shown in FIG. 23, a stationary bin in accordance with the present invention is erected over a false floor 198 on two support cubes 200a and 200b. Support cubes 200a and 200b can be formed of any suitably strong material, one suitable material being layers of paper industrial honeycomb covered with mild steel sheet material.

A discharged trough 202, into which the contents of the bin are emptied, is located between support cubes 200a and 200b.

A stationary bin in accordance with the present invention can be erected on an upper floor of a building, and if the stored material is to be used on the floor below, no false floor is required and the material can be discharged through a discharge opening in the upper floor.

Referring back to FIG. 23, the stationary bin has a fill opening 204 in the top thereof, through which material is introduced into the bin for storage by means of a pneumatic fill or gravity feed line 206. The bin further includes a discharge opening 208 that is centrally located in the bottom portion of the bin and in registry with the discharge trough 202 between support cubes 200a and 200b.

The stationary bin further includes a primary bin support frame 210 that, in the embodiment shown, has side members shaped like the letter "A" for structural strength, the side members being linked by a cross member extending over the top of the bin.

Dump assemblies 212a and 212b are located on opposite sides of the discharge opening 208. Each dump assembly has a bin floor panel 214 that is hinged adjacent to the discharge opening of the bin and pivotable from a generally horizontally position as shown for dump assembly 212a in FIG. 23 to an angled position as shown for dump assembly 212b for dumping bulk material into discharge opening 208.

If desired, a complete stationary bin can be provided with a single dump assembly that urges bulk material through a discharge opening on one side of the bin, similar to the previously described convertible transport embodiment shown in FIG. 22.

Figure 24:
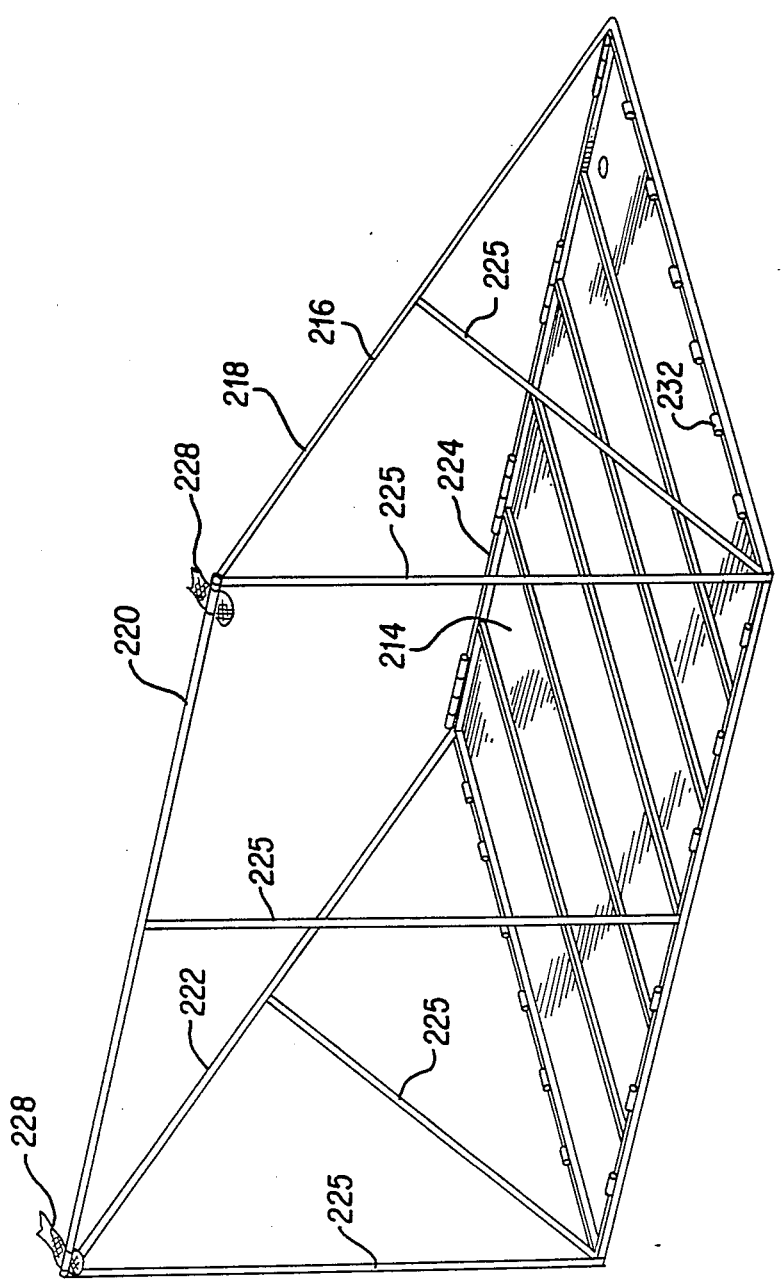
FIG. 24 is a perspective view showing details of the dump assembly of the bin shown in FIG. 23, with the flexible wall of the bulk container removed.

With reference to FIG. 24, each dump assembly includes a rigid secondary frame 216 connected to the bin floor panel 214 and pivotable therewith. The rigid secondary frame 216 can be formed of any suitably strong material, such as steel tubing or rod. In the embodiment shown, the secondary frame includes a generally "U-shaped" bracket formed of members 218, 220 and 222 that is attached to the bin floor panel adjacent the hinged edge 224 of the bin floor panel 214, and is further ridgidly connected to the thin floor panel by braces 225.

If desired, the lower surface of the bin floor panel 214 or the top surface of the false floor 198, can be made uneven, e.g. by providing raised strips thereon to provide passageways in the air bag that allow inflation of the bag to begin during initial start up.

Referring back to FIG. 23, the stationary bin further includes a flexible bin wall portion 226. As in the previously described convertible transport embodiment, the flexible bin wall portion is comprised of a tent-like enclosed body that includes side walls, end walls, a floor, and top wall portions. The flexible bin wall portion 226 is connected at the top thereof to primary frame 210. The flexible bin wall portion 226 is connected at the sides thereof to the secondary frames of respective dump assemblies 212a and 212b. The bottom of the flexible bin wall portion 226 is connected to the bin floor panel 214. The flexible bin wall portion thus forms an enclosure for storage of bulk materials.

The flexible bin wall portion is attached to the primary and secondary frames of the bin floor panel by any suitable means. For example, the top portion of flexible wall 226 can be connected to the top cross member of primary frame 210 by straps, as shown for the convertible transport embodiment shown in FIG. 16. The side portions of the flexible bin wall can be attached to the base leg 220 of the U-shaped bracket 216 by means of straps 228, as shown in FIG. 24. The bottom of the flexible wall portion is connected to the floor panels by "curtain rod" type connectors which include a plurality of tabs 230 around the periphery of the wall portion (shown in FIG. 25), which fall between eyelets 232 (shown in FIG. 24), about the outer perimeter of the floor panels. As previously described for the "curtain rod" connectors utilized with the previously described convertible transport embodiments, slide bars are passed through the aligned tabs and eyelets to securely hold the floor of the bin to each of the floor panels.

In inflatable air bag 234a, 234b underlies respective bin floor panels 214, for inclining the floor panel toward the discharge opening and thereby directing bulk materials stored in the bin through the discharge opening. The air bags are sequentially filled with low pressure air to individually and gradually raise the floor panels to an inclined position. The inner floor panel thereby forms an inclined wall for directing stored bulk material contained in the bin through the discharge opening of the bin into the discharge trough to be conveyed away by any suitable conveyor means. As in the previously described convertible transport embodiment, the air bag 234 can include an inner bladder and an outer bladder, having separate inflation lines, the inner bladder allowing discharge of the bin in the event that the outer bladder ruptures.

The inflatable air bags 234a and 234b are sequentially inflated by low pressure air from a suitable blower. If desired, blower can be manually controlled to raise a dump assembly and maintain flow of material from the bin. A manually inflated system can incorporate a butterfly valve pressure release system as shown in FIG. 19 in connection with a convertible transport embodiment of the invention. In a manually controlled system, after one dump assembly, e.g. dump assembly 212b, is raised and all bulk material is discharged from that side of the bin, a valve such as valve 262 shown in FIG. 23 can be manually shifted to direct low pressure from blower 264 for inflation of air bag 234a under manual control.

In a semi-automatic discharge system, means are provided for automatically emptying each side of the bin. Sensing means are provided that control application of fluid pressure to the bags to keep the bulk material flowing.

According to one embodiment, the product flow sensing means is an amperage meter 266 connected to the motor of the screw conveyor 240. When the screw is full of bulk product, the motor will draw a high amount of amperage, but when the screw has little or no bulk material in it, the amperage draw will be low. Low amperage draw causes the blower to turn on via controller 268 and further inflate the air bag, which tilts the lifting the platform and causes the conveyor to be filled with bulk material. As the bulk material fills the conveyor and causes a greater load or resistence on the screw, the amperage draw increases and shuts off the blower.

Figure 27:
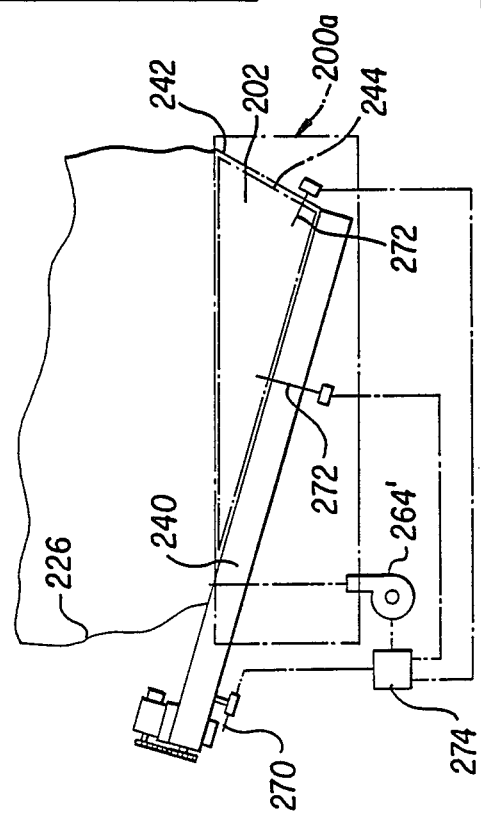
FIG. 27 is a side elevation view, partly schematic, showing details of one conveyor system suitable for use with the stationary bin shown in FIG. 23.

In another embodiment, a probe 270 is positioned at or near the opening of the conveyor discharge outlet. Probe 270 signals the blower to turn on and off relative to product discharge rate. See FIG. 27. Alternatively or additionally, a plurality of probes 272 can be provided at different points in the transition hopper 242, as shown in FIG. 27. For discharging bulk materials that tend to bridge, cake and the like, probes 272 (and probe 270 if present) are monitored by controller 274 to control blower 264' and air bag inflation.

If desired, a high pressure switch can be provided for sensing when pressure within in the inflatable air bags reach or exceed an undesired pressure level. If undesirable high pressure is developed within the bag, such as might occur with discharge blockage or refilling of the bin with bulk material during inflation, the high pressure switch shifts a control valve, such as valve 262 shown in FIG. 23, to immediately deflate the air bag and allow the dump assembly to lower itself against the false floor.

Any of the above systems for discharge can be adapted for completely automatic sequential discharge of the entire bin. This is accomplished by providing a switch 276 that is activated, e.g., by a teather 278, at the end of an emptying cycle for one side of the bin. See FIG. 23. Activation of switch 276 shifts the valve 262 so that the air flow is directed to the opposite of the bin.

If desired, a dust cover 236 can be provided to enclose the air bag compartment, and access to inside the bin through flexible membrane 226 can be provided by a closeable zipper opening 238.

Figure 28:
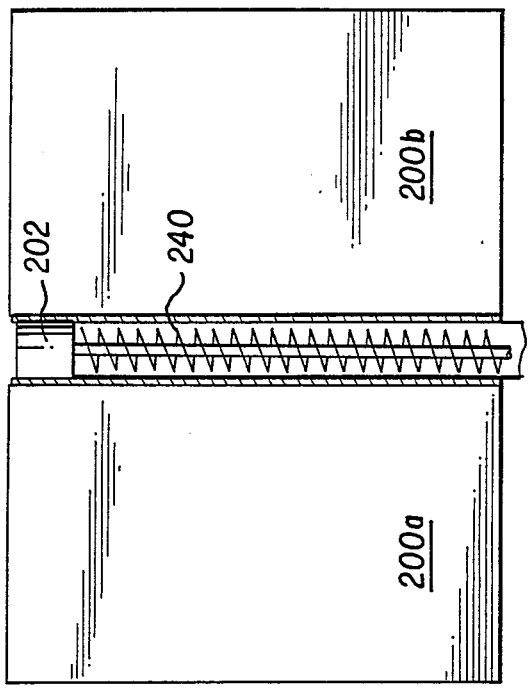
FIG. 28 is top plan view, partly schematic, of a bin shown in FIG. 23.
Figure 29:
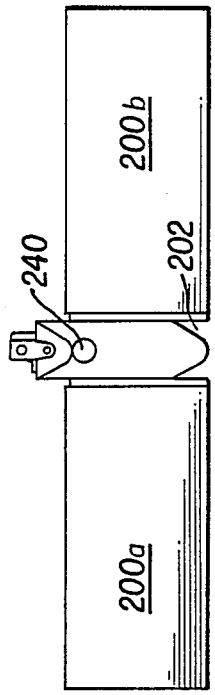
FIG. 29 is a front elevation view, partly schematic, showing a false floor with a conveyor system housed in a discharge trough therein for use with a bin as shown in FIG. 23.
Figure 30:
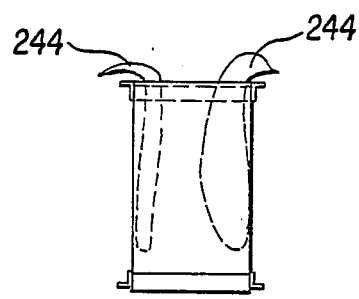
FIG. 30 is a side elevation view showing details of the discharge trough of FIG. 29 with the conveyor removed.
Figure 31:
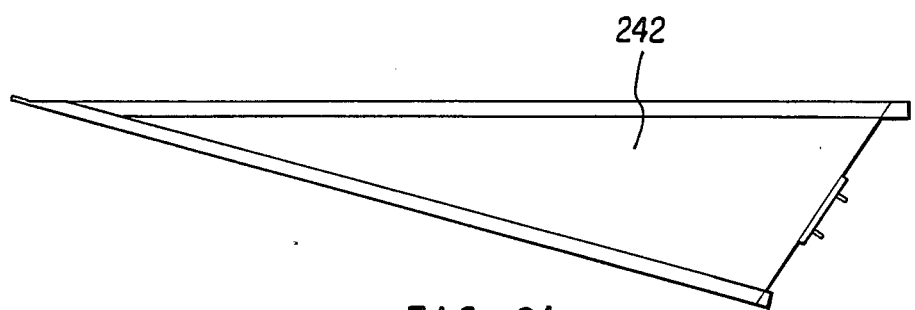
FIG. 31 is a side elevation view of a transition hopper leading to a conveyor for use with a stationary bin as shown in FIG. 23.

Any suitable conveyor means can be provided in the discharge trough between the support cubes of the false floor, such as a sloped vibratory trough, air slide or screw conveyor. In the embodiment shown, a screw conveyor 240 is positioned within the discharge trough 202 between support cubes 200a and 200b. See FIGS. 27–29. The screw conveyor 240 extends upwardly through the discharge trough 202 at an angle of, for example, about 18°. Leading to the screw conveyor 240 is a sloped-wall transition hopper 242 that may include one or more inflatable sleeves 244, shown in FIG. 30 and in phantom lines in FIG. 27. Inflatable sleeve or sleeves 244 aid flow of bridgeable materials by breaking the materials up in the vicinity of the discharge trough 242.

Figure 25:
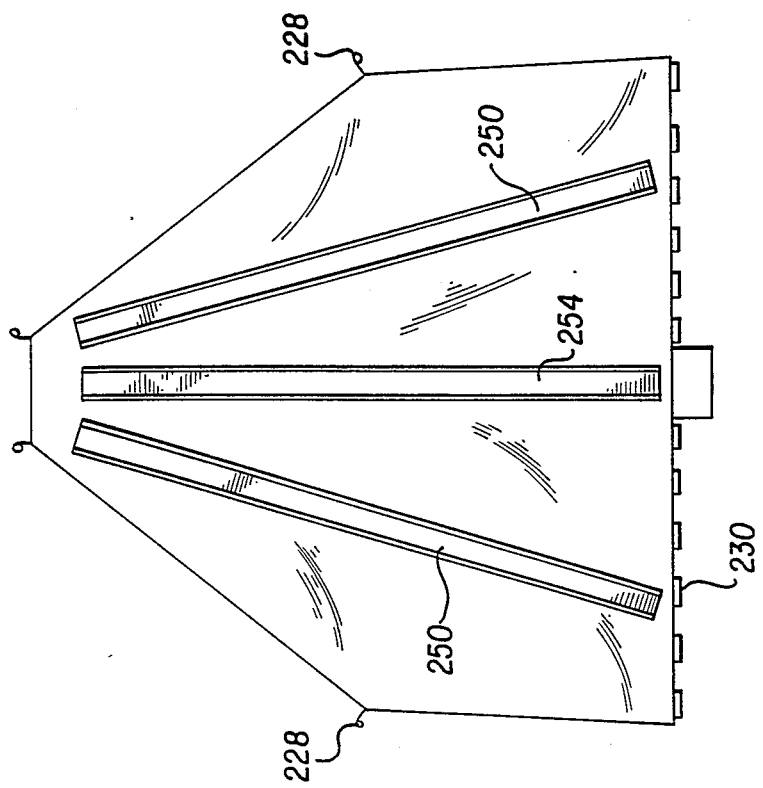
FIG. 25 is a side elevation view of the flexible walled bulk container bag of the bin shown in FIG. 23.
Figure 32:
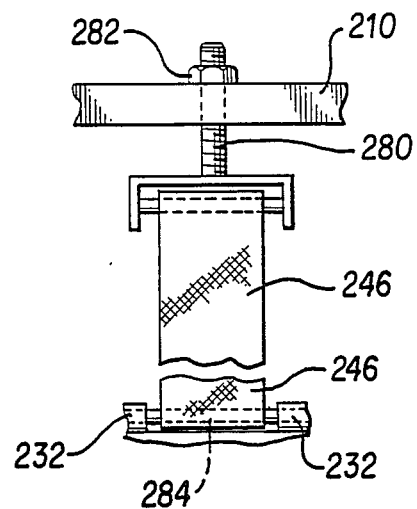
FIG. 32 is a partly schematic side elevation view showing details of one embodiment for attaching side bin support straps to a primary frame and a bin floor panel.

Side support straps 246 extend angularly between the top cross member of the primary frame 210 and the bottom portion of each dump assembly on opposite sides of the bin. The web support straps 246 pass through web guide slots 250 on the sides of the flexible bin or are attached directly to the sidewall of the bin. FIG. 25 shows the angular web guide slots 250 on the sides of the flexible bin wall portion. Support straps 246 can be connected to the top cross member of primary frame 210 as shown in FIG. 32. According to this embodiment, the support strap 246 attached at the top thereof to a threaded connector bolt 280 that fits within a corresponding opening in the top cross member of primary frame 210. A nut 282 is threadably engaged with bolt 280. The looped bottom end of support strap 246 can be connected to the bin floor panel 214 by means of a slide bar 284 passing through the looped end of strap 246 between eyelets 232. Nut 282 is rotated until strap 246 is taut when the dump assemblies are in the configuration shown for dump assembly 212a in FIG. 23. The support straps 246 thus assist in maintaining the shape of the bin when the bin is being filled with bulk material. Tension on the support straps 246 is released as a dump assembly is pneumatically lifted, as in the configuration shown for dump assembly 212b in FIG. 23. If desired, a centrally located tension strap 252 can be provided on each side of the bin (see FIG. 23) that passes through or is secured to a respective central web guide 254 shown in FIG. 25.

Figure 26:
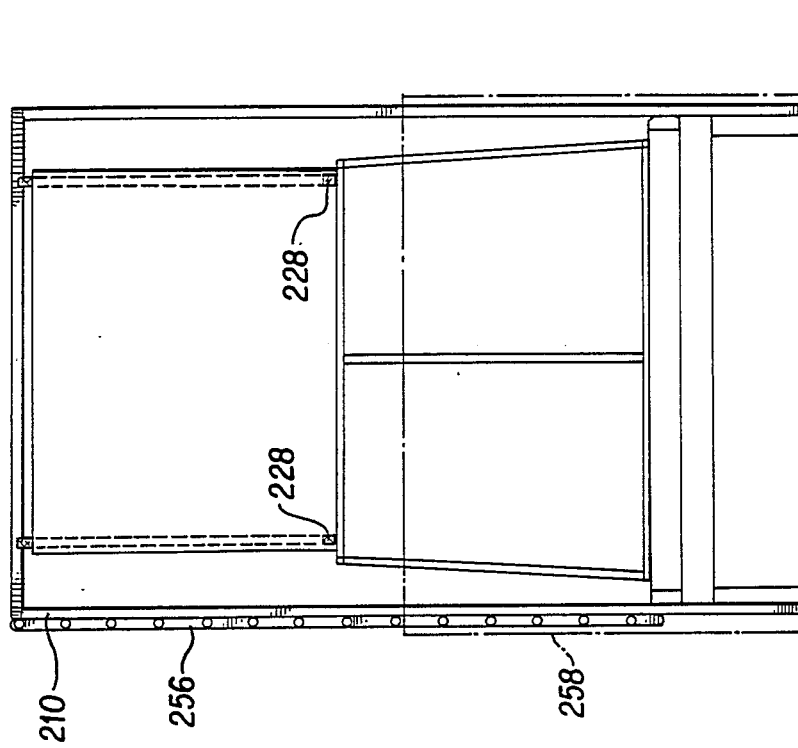
FIG. 26 is a end elevation view, partly schematic, of the stationary bin shown FIG. 23.

For access to the top of the bin, a ladder 256 can be provided, extending upwardly along the primary bin support frame 210, as shown FIG. 26. Also, a guard wall 258 (shown in phantom lines in FIG. 26) can be provided around the perimeter of the stationary bin to protect the flexible wall from being pierced, e.g. by a forklift, the guard wall being hinged or removable for access to the stationary bin.

Figure 33:
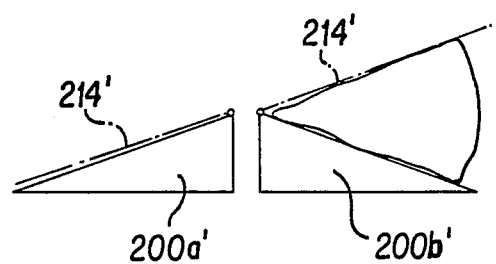
FIG. 33 is a side elevation view, partly schematic, showing support cubes for a false floor for a bin in accordance in another embodiment of the invention.

The false floor need not be parallel with the actual floor on which the bin rests. For increased storage capacity, the false floor can taper downwardly from the discharge trough towards the floor by providing wedge-shaped support "cubes" 200a' and 200b' that provide a downwardly angled bin floor panel 214' when the bin is at rest. See FIG. 33.

When utilizing a pneumatic fill line 206 to fill the bin with bulk material, air is allowed to escape the bin during filling through a dust filter means such as dust bag 260 that covers an opening in the top of the bin and allows air to pass out of the bin while filtering dust from the air and preventing the dust from exiting the bin. See FIG. 23.

A bin in accordance with the present invention having a pair dump assemblies, one on each side of a discharge opening, with sequential emptying of the opposing dump assemblies of the bin, ensures that the bulk material in the bin is routinely cleaned out even if the bin is never completely emptied before being refilled with bulk material. With sequential unloading, a dump assembly is completely emptied before activation of the other dump assembly, even if there has been an intervening refilling of the bin.

Figure 34:
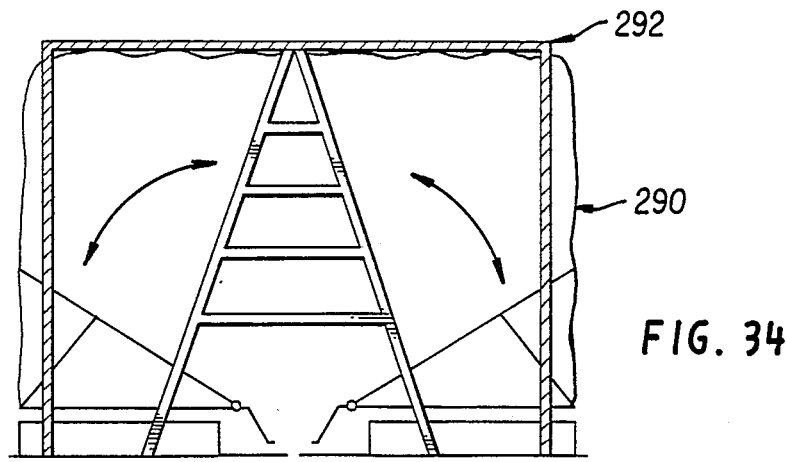
FIG. 34 is a side elevation view showing a stationary bin according to yet another embodiment of the invention.
Figure 35:
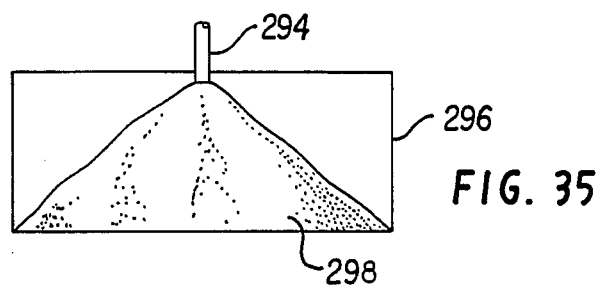
FIG. 35 is a schematic side elevation view showing bulk material reaching its natural angle of repose during filling of a bulk bin in accordance with the embodiment shown in FIG. 34, with conventional central loading of bulk material into the bin.
Figure 36:
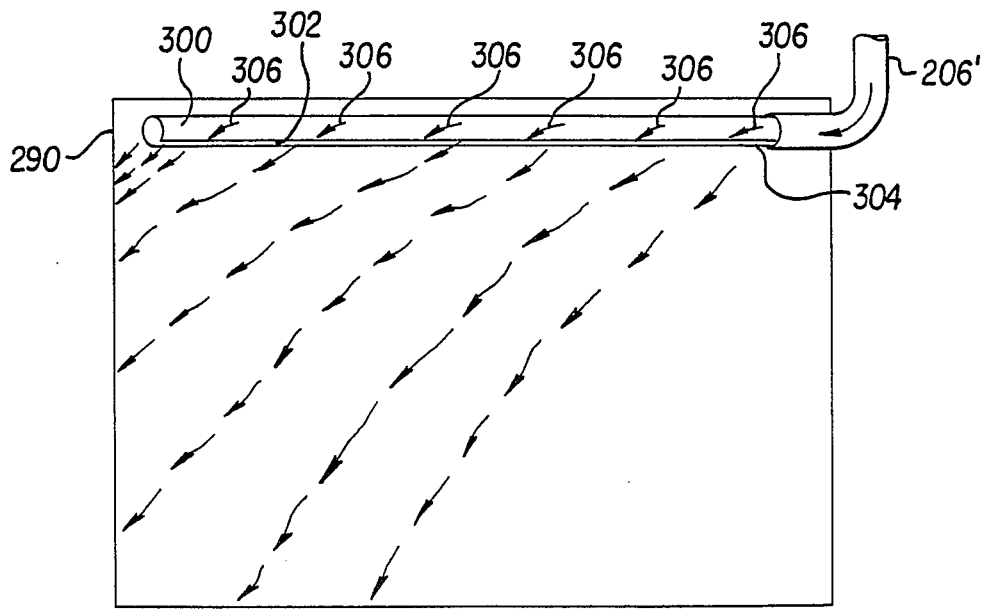
FIG. 36 is a schematic side elevation view showing a broadcaster for loading bulk material into a bin as shown in FIG. 34 to the full capacity of the bin.

If desired, a bin having a rectangular flexible bin wall portion can be utilized for added storage capacity, rather than a tent-like enclosed body as previously described. In this embodiment, the rectangular flexible bin wall portion 290 is supported within a rectangular bag frame 292, as shown in FIG. 34. With a rectangular shaped storage bin, it is necessary to provide a "broadcaster" to properly fill the bin close to capacity with bulk material. Otherwise, with conventional central loading 294 of a bin 296 the bin would stop filling once the material 298 reached its natural angle of repose as shown in FIG. 35. One suitable broadcaster for use with the rectangular bin 290 of the present invention is shown in FIG. 36. According to this embodiment, a pneumatic fill line 206' feeds bulk material into the bin through a pipe 300 having a slit 302 in the bottom thereof. Initially, bulk material immediately exists the slit pipe at the end thereof nearest the juncture with fill line 206', and piles up until the material builds up against the bottom slit at 304 and closes off the pipe at that portion of the slit, forcing the bulk material to be pushed further into the bin in the direction of arrows 306. Bulk material keeps building up further and further out along the slit as the slit is closed off, until the slit is completely closed when the bin is filled.

A stationary bin according to the present invention typically can be assembled without substantial modification of the building where it is placed, and can be set up easily, taken down, moved and the like. The invention provides an inexpensive way to store and handle bulk materials, and the load is transferred evenly to the floor.

While this invention has been described in detail with reference to the specific embodiments set forth above, the invention is not intended to be limited to those specific structures, but is intended to cover any modifications or changes that may come within the scope and spirit of the invention.

What is claimed is:

1. A bin for storing and handling bulk material, the bin having a fill opening through which material is introduced into the bin for storage, and a discharge opening in a bottom portion of the bin through which material stored in the bin is discharged, the bin further including a primary bin support frame, the bin having at least one dump assembly with a bin floor panel that is hinged adjacent the discharge opening of the bin and pivotable from a position at rest for loading the bin to a position inclined toward the discharge opening for dumping bulk material into the discharge opening, the dump assembly including a selectively collapsible secondary frame connected to the bin floor panel and pivotable with the bin floor panel, the bin further including a flexible and collapsible bin wall portion connected to the primary and secondary frames and to the bin floor panel to form an enclosure for storage of bulk materials, the flexible bin wall portion being supported in an erect configuration by the primary and secondary frames for storage and discharge of bulk materials, the bin further including an inflatable bag underlying the bin floor panel, for inclining the floor panel toward the discharge opening and thereby directing bulk material stored in the bin through said discharge opening, the bin further including a rigid lifting shield underlying the inflatable bag and hoisting means for raising the rigid lifting shield to a bin storage position with the secondary frame and the flexible bin wall collapsed.

2. The bin of claim 1 including a pair of opposing dump assemblies hinged on opposite sides of said discharge opening, the bin floor panel of each dump assembly including a separately inflatable bag thereunder.

3. The bin of claim 2 wherein said flexible bin wall portion includes at least one pleat that permits the flexible bin wall portion to collapse during hoisting of the lifting shield while said flexible bin wall portion is connected to said secondary frame.

4. The bin of claim 2 further including means for preventing bulging of the flexible bin wall portion during loading and storage of bulk material by the bin.

5. The bin of claim 4 wherein the means for preventing bulging of the flexible bin wall portion is comprised of a plurality of side support straps supporting the flexible bin wall portion and connecting each dump assembly to the primary frame.

6. The bin of claim 2 further including means for limiting end sway of the bin.

7. The bin of claim 6 wherein the end sway-limiting means is comprised of cables connecting upper ends of the secondary frame to respective opposite sides of said bin floor panel.

8. The bin of claim 2 wherein the hoisting means is supported by the primary bin support frame.

9. The bin of claim 2 wherein the hoisting means includes a rotatable live axle that controls rotation of a pair of spools so as to wind respective straps associated therewith that are attached to said lifting shield, which straps pass through associated pulleys that are mounted on the primary bin support frame.

10. A freight vehicle having a cargo space convertible from a piece goods handling mode with a space suitable for piece goods to a bulk goods handling mode with space suitable for bulk material, the vehicle being of the type including means defining a cargo space having a substantially flat support bed, a bin for storing and handling bulk material, the bin having a fill opening through which material is introduced into the bin for storage, and a discharge opening in a bottom portion of the bin through which material stored in the bin is discharged, the bin being selectively lowerable onto the flat support bed with the discharge opening of the bin positioned adjacent to a discharge area of the flat bed to bring the discharge opening of the bin into alignment with the discharge area of the flat bed, the bin further including a primary bin support frame, the bin having at least one dump assembly with a bin floor panel that is hinged adjacent the discharge opening of the bin and pivotable from a position at rest for loading the bin to a position inclined toward the discharge opening for dumping bulk material into the discharge opening, the dump assembly including a selectively collapsible secondary frame connected to the bin floor panel and pivotable with the bin floor panel, the bin further including a flexible and collapsible bin wall portion connected to the primary and secondary frames and to the bin floor panel to form an enclosure for storage of bulk materials, the flexible bin wall portion being supported in an erect configuration by the primary and secondary frames for storage and discharge of bulk materials, the bin further including an inflatable bag underlying the bin floor panel, for inclining the floor panel toward the discharge opening and thereby directing bulk material stored in the bin through said discharge opening, the bin further including a rigid lifting shield underlying the inflatable bag and hoisting means for raising the rigid lifting shield to a bin storage position with the secondary frame and the flexible bin wall collapsed.

11. The freight vehicle of claim 10 including a pair of opposing dump assemblies hinged on opposite sides of said discharge opening, the bin floor panel of each dump assembly including a separately inflatable bag thereunder.

12. The freight vehicle of claim 11 wherein said flexible bin wall portion includes at least one pleat that permits the flexible bin wall portion to collapse during hoisting of the lifting shield while said flexible bin wall portion is connected to said secondary frame.

13. The freight vehicle of claim 11 further including means for preventing bulging of the flexible bin wall portion during loading and storage of bulk material by the bin.

14. The freight vehicle of claim 13 wherein the means for preventing bulging of the flexible bin wall portion is comprised of a plurality of side support straps supporting the flexible bin wall portion and connecting each dump assembly to the primary frame.

15. The freight vehicle of claim 11 further including means for limiting end sway of the bin.

16. The freight vehicle of claim 15 wherein the end sway-limiting means is comprised of cables connecting upper ends of the secondary frame to respective opposite sides of said bin floor panel.

17. The freight vehicle of claim 11 wherein the hoisting means is supported by the primary bin support frame.

18. The freight vehicle of claim 11 wherein the hoisting means includes a rotatable live axle that controls rotation of a pair of spools so as to wind respective straps associated therewith that are attached to said lifting shield, which straps pass through associated pulleys that are mounted on the primary bin support frame.

* * * * *